US011268503B2

(12) United States Patent
Byrski et al.

(10) Patent No.: US 11,268,503 B2
(45) Date of Patent: Mar. 8, 2022

(54) FLUID DELIVERY SYSTEM

(71) Applicant: TI Group Automotive Systems, LLC, Auburn Hills, MI (US)

(72) Inventors: Aleksander Byrski, Bystra (PL); Richard Cerini, Chester, CT (US); Lynwood F. Crary, Preston, CT (US); Alastair R. Deane, Rochester Hills, MI (US); Emmanuel Demance, Chálons en Champagne (FR); Krzysztof Podstawny, Jasienica (PL); Tadeusz Skiba, Cieszyn (PL)

(73) Assignee: TI GROUP AUTOMOTIVE SYSTEMS, LLC, Auburn Hills, MI (US)

( * ) Notice: Subject to any disclaimer, the term of this patent is extended or adjusted under 35 U.S.C. 154(b) by 261 days.

(21) Appl. No.: 15/099,704

(22) Filed: Apr. 15, 2016

(65) Prior Publication Data

US 2016/0305381 A1  Oct. 20, 2016

Related U.S. Application Data

(60) Provisional application No. 62/148,421, filed on Apr. 16, 2015.

(51) Int. Cl.
*F04B 23/02* (2006.01)
*F02M 37/00* (2006.01)
(Continued)

(52) U.S. Cl.
CPC ......... *F04B 23/02* (2013.01); *F02M 37/0011* (2013.01); *F02M 37/0088* (2013.01);
(Continued)

(58) Field of Classification Search
CPC ........ F04B 23/021; F04B 53/22; F04B 23/02; F04B 53/16; F02M 37/025;
(Continued)

(56) References Cited

U.S. PATENT DOCUMENTS 5,218,942 A * 6/1993 Coha .................... F02M 37/106
                                                    123/509
5,951,050 A * 9/1999 Siekmann ............ B60K 15/077
                                                    280/830
(Continued)

FOREIGN PATENT DOCUMENTS

JP      2004316567 A    11/2001
JP      2005220923 A     8/2005
(Continued)

OTHER PUBLICATIONS

International Search Report, Serial No. PCT/US2016/027681, dated Jun. 28, 2016.

*Primary Examiner* — Alexander B Comley
(74) *Attorney, Agent, or Firm* — Dickinson Wright PLLC

(57) ABSTRACT

A system of fuel delivery assemblies is provided. In one example, the system includes two separate fuel pump assemblies each having a reservoir with an interior to receive fuel. Each reservoir has at least one dimension that is different than the other reservoir. A housing is adapted to be separately coupled to each of the reservoirs so that a cartridge may be separately used with both fuel pump assemblies. The cartridge orients at least one fuel system component relative to the reservoir to which the reservoir is connected.

19 Claims, 14 Drawing Sheets

(51) Int. Cl.
*F02M 37/10* (2006.01)
*F02M 37/44* (2019.01)
*F02M 37/50* (2019.01)
*F04B 53/16* (2006.01)
*F02M 37/02* (2006.01)
*F04F 5/10* (2006.01)
*F04F 5/46* (2006.01)
*B60K 15/03* (2006.01)

(52) U.S. Cl.
CPC ........ *F02M 37/025* (2013.01); *F02M 37/106* (2013.01); *F02M 37/44* (2019.01); *F02M 37/50* (2019.01); *F04B 53/16* (2013.01); *F04F 5/10* (2013.01); *F04F 5/46* (2013.01); *B60K 15/03* (2013.01); *B60K 2015/03243* (2013.01)

(58) Field of Classification Search
CPC ....... F02M 37/0088; F02M 37/10–106; F02M 37/0094; F02M 2037/225; F02M 37/0011; F02M 37/44; F02M 37/50; F04F 5/10; F04F 5/46; B60K 15/03; B60K 2015/03243
USPC ....................................................... 123/509
See application file for complete search history.

(56) References Cited

U.S. PATENT DOCUMENTS

| | | |
|---|---|---|
| 6,267,103 B1 | 7/2001 | Ludwig et al. |
| 6,675,778 B1 | 1/2004 | Kemper et al. |
| 7,108,487 B2 * | 9/2006 | Koba ................... F02M 37/103 417/360 |
| 7,675,405 B2 | 3/2010 | Rumpf |
| 7,886,721 B2 | 2/2011 | Sanden |
| 2004/0055581 A1 | 3/2004 | Okazono et al. |
| 2004/0129626 A1 | 7/2004 | Fischer et al. |
| 2005/0016506 A1 | 1/2005 | Schultz et al. |
| 2005/0194796 A1 | 9/2005 | Powell |
| 2006/0021603 A1 | 2/2006 | Nagata |
| 2007/0056567 A1 * | 3/2007 | Perruchot ........... F02M 37/106 123/509 |
| 2007/0062493 A1 * | 3/2007 | Crary ................... F02M 37/103 123/509 |
| 2007/0266762 A1 | 11/2007 | Rumpf |
| 2008/0035120 A1 | 2/2008 | Sone et al. |
| 2011/0168134 A1 | 7/2011 | Lim et al. |
| 2012/0222655 A1 | 9/2012 | Powell |
| 2012/0247431 A1 * | 10/2012 | Powell ................. F04B 23/021 123/497 |
| 2012/0251341 A1 | 10/2012 | Powell |
| 2013/0048119 A1 * | 2/2013 | Kim ................... F02M 37/0094 137/565.01 |
| 2013/0133765 A1 | 5/2013 | Israelson et al. |
| 2015/0059709 A1 * | 3/2015 | Oohashi ................. B60K 15/03 123/509 |

FOREIGN PATENT DOCUMENTS

| | | |
|---|---|---|
| JP | 2009243331 A | 10/2009 |
| WO | WO 2006/034937 A1 | 4/2006 |

\* cited by examiner

FLUID DELIVERY SYSTEM

CROSS REFERENCE TO RELATED APPLICATIONS

This application claims the benefit of U.S. Provisional Patent Application Ser. No. 62/148,421, filed Apr. 16, 2015, entitled "Fluid Delivery System," the content of which is hereby incorporated by reference in its entirety.

TECHNICAL FIELD

The present disclosure relates generally to fluid delivery systems, and relates more particularly to a fuel pump assembly for delivering fuel from a fuel tank to an engine, a fuel delivery system including such a fuel pump assembly, a housing for such a fuel pump assembly, and a system of fuel delivery assemblies.

BACKGROUND

Fluid delivery systems including a fuel pump assembly are used in motor vehicles for delivering fuel from a fuel tank to an engine for combustion within the engine. These fluid delivery systems typically include a mounting flange closing an opening in an upper wall of the fuel tank, a fuel reservoir carried by the mounting flange and disposed within the fuel tank, a fuel pump assembly disposed in the reservoir, and several hoses and hose interconnections between and among the mounting flange, the fuel reservoir, and the fuel pump assembly. Further improvements in fluid delivery systems are desirable that allow, for example, for relatively easy interchangeability of the fluid delivery system components, reduce part count and/or more efficient manufacturing processes, as well as cost advantages realized due to an increased volume of common production components, shorter development times for new programs as well as relatively lower development and tooling costs.

SUMMARY

Pump assemblies for fuel delivery, housings for fuel pump assemblies, and systems of fuel delivery assemblies are provided herein. In an exemplary embodiment, a pump assembly includes a reservoir having an interior to receive fuel. A fuel pump has an inlet arranged to receive fuel from the interior of the reservoir and an outlet through which pressurized fuel is discharged. A housing is carried by the reservoir with the fuel pump received at least partially between the housing and the reservoir. The housing includes at least one fuel passage through which pressurized fuel from the fuel pump is routed.

In one aspect, the assembly includes a fuel filter carried by the reservoir. The fuel pump outlet is communicated with an inlet of the fuel filter and an outlet of the fuel filter is communicated with the housing passage.

In another aspect, the housing passage includes a first passage and the housing also includes a second passage in communication with the first passage. Fuel flowing through the first passage is routed to an engine and fuel flowing through the second passage is routed to a pump that pumps fuel into the reservoir.

In yet another aspect, the pump is a jet pump that is carried by the reservoir.

In one aspect, the reservoir includes an outlet passage through which fuel flows to an inlet of the jet pump and the reservoir includes an inlet passage that is communicated with the reservoir interior and through which fuel pumped by the jet pump flows into the reservoir interior.

In another aspect, the reservoir inlet passage includes a first inlet passage and the reservoir includes a second inlet passage and a second jet pump is carried by the reservoir to pump fuel through the second inlet passage.

In yet another aspect, the jet pump is carried by a manifold that is carried by the reservoir. The manifold has an inlet communicated with the reservoir outlet passage and an outlet leading to an inlet of the jet pump.

In one aspect, the fuel pump and fuel filter are received within the reservoir interior and the housing engages at least one of the fuel pump and fuel filter to retain the position of that component within the reservoir.

In another aspect, the reservoir includes a body and one or more mounting feet carried by the body. The mounting feet are adapted to be connected to and flex relative to an interior surface of a fuel tank to permit relative movement between the fuel tank and the reservoir body.

In another aspect, the fuel pump, fuel filter and housing are assembled into the reservoir in a common direction.

In yet another aspect, the apparatus also includes a mounting flange coupled to one or both of the reservoir and the housing and adapted to mount the assembly to a fuel tank. The mounting flange is assembled to one or both of the housing and the reservoir in said common direction.

In yet another aspect, the apparatus also includes a manifold carried by the reservoir. The manifold is assembled to the reservoir in said common direction.

In one aspect, the apparatus includes an adapter that mounts to the housing and the reservoir. The adapter, housing and reservoir are assembled in said common direction.

In an exemplary embodiment, a system of fuel delivery assemblies includes two separate fuel pump assemblies each having a reservoir with an interior to receive fuel. Each reservoir has at least one dimension that is different than the other reservoir. A housing is adapted to be separately coupled to each of the reservoirs so that the cartridge may be separately used with both fuel pump assemblies. The cartridge orients at least one fuel system component relative to the reservoir to which the reservoir is connected.

In one aspect, at least one of the reservoirs includes an adapter and the adapter includes an attachment feature engageable by the housing and a coupling feature engageable with the reservoir to couple the housing to the reservoir.

In another aspect, the housing is associated with a fuel pump and a fuel filter and positions at least part of the fuel pump and fuel filter relative to the reservoir to which the housing is connected.

In yet another aspect, the reservoirs have different internal volumes.

In one aspect, the housing overlies at least part of the fuel filter.

In another aspect, the filter includes a filter element enclosed within the housing.

In yet another aspect, the reservoirs each include a mount and the mounts of both reservoirs are of the same shape so that they are capable of carrying the same fuel level sensor, and in assembly, one fuel level sensor is mounted to each reservoir.

In one aspect, each reservoir includes a wall with an attachment feature that includes a mechanical coupling feature integrally formed in the wall. The housing includes an integral mounting feature engageable with the mechanical coupling feature of each reservoir to retain the position of the housing relative to a reservoir to which the housing is attached.

In another aspect, the housing is adapted to mate with at least two different fuel pumps, the two different fuel pumps having at least one dimension that is different.

In yet another aspect, the housing is adapted to mate with at least two different fuel filters, the two different fuel filters having at least one dimension that is different.

In an exemplary embodiment, a system of fuel delivery assemblies includes two separate fuel pump assemblies each having a reservoir with an interior to receive fuel. Each reservoir has at least one dimension that is different than the other reservoir and each reservoir includes an outlet passage from which fuel is discharged and an inlet passage into which fuel is received. A manifold is adapted to be separately coupled to each of the reservoirs with an inlet communicated with the reservoir outlet passage to receive fuel discharged from the reservoir outlet passage and an outlet communicated with the reservoir inlet passage so that fuel discharged from the outlet is received in the inlet passage. The reservoirs and manifolds being constructed and arranged so that the two different reservoirs are adapted to be coupled to identical manifolds.

In one aspect, the system also includes a nozzle carried by the manifold outlet. Each reservoir includes an inlet in communication with the inlet passage of that reservoir. The discharge of fuel through the nozzle and out of the manifold outlet causes fuel in the area of the reservoir inlet to be entrained into the reservoir inlet along with the flow of fuel from the manifold outlet.

In another aspect, the inlet passage communicates with the reservoir interior to provide fuel into the reservoir interior.

In yet another aspect, the reservoir includes a second inlet passage and the manifold includes a second outlet passage. The second outlet passage is communicated with the manifold inlet so that fuel received in the manifold inlet is routed to both outlet passages of the manifold and fuel that flows through the manifold second outlet passage flows into the reservoir second inlet passage.

In one aspect, the system also includes the reservoir inlet passage, reservoir outlet passage, and manifold.

In an exemplary embodiment, a pump assembly includes a reservoir having an interior to receive fuel. A fuel pump has an inlet arranged to receive fuel from the interior of the reservoir and an outlet through which pressurized fuel is discharged. A bracket is coupled to the reservoir and adapted to be coupled to a fuel tank to mount the reservoir to the fuel tank.

In one aspect, the bracket includes a mount for a fuel level sensor.

In another aspect, the bracket includes a lock moveable from a released position to a retaining position. The reservoir includes a surface engageable by the lock to couple the bracket to the retainer.

In yet another aspect, the reservoir surface engageable by the lock is contoured to provide a cam action between the reservoir and bracket.

In one aspect, the bracket includes at least one foot adapted to be coupled to a fuel tank in which the reservoir is received.

In an exemplary embodiment, a housing for a fuel pump assembly that includes a reservoir and a fuel pump is provided. The housing includes at least one mounting feature adapted to engage an attachment feature of the reservoir to couple the housing to the reservoir. A coupler is adapted to retain a fuel system component between the housing and the reservoir. At least one fuel passage is adapted to receive fuel discharged from the fuel pump.

In one aspect, the mounting feature is adapted to be engaged with an attachment feature on two different reservoirs so that an identical housing can be used on each of two different reservoirs.

In an exemplary embodiment, a pump assembly includes a reservoir having a body with an attachment feature and an interior to receive fuel. A cartridge includes a fuel pump and a fuel filter carried by the reservoir and has a housing with a mounting feature that engages the attachment feature to couple together the cartridge and reservoir and a fuel passage through which pressurized fuel discharged from the fuel pump flows.

In one aspect, the fuel filter receives fuel discharged from the fuel pump and the fuel that flows out of the fuel filter flows through the fuel passage in the housing.

In another aspect, the reservoir includes one or more mounting feet adapted to flex relative to an interior surface of a fuel tank to permit relative movement between the fuel tank and the reservoir body.

In yet another aspect, the pump assembly includes a receptacle on an exterior surface of the reservoir body sized to receive a jet manifold.

In one aspect, the fuel filter is annular and the fuel pump is generally concentric with the fuel filter.

In another aspect, the fuel filter is annular and the fuel pump is not concentric with the filter.

BRIEF DESCRIPTION OF THE DRAWINGS

The following detailed description of preferred embodiments and best mode will be set forth with reference to the accompanying drawings, in which.

DETAILED DESCRIPTION OF PREFERRED EMBODIMENTS

Figure 1:
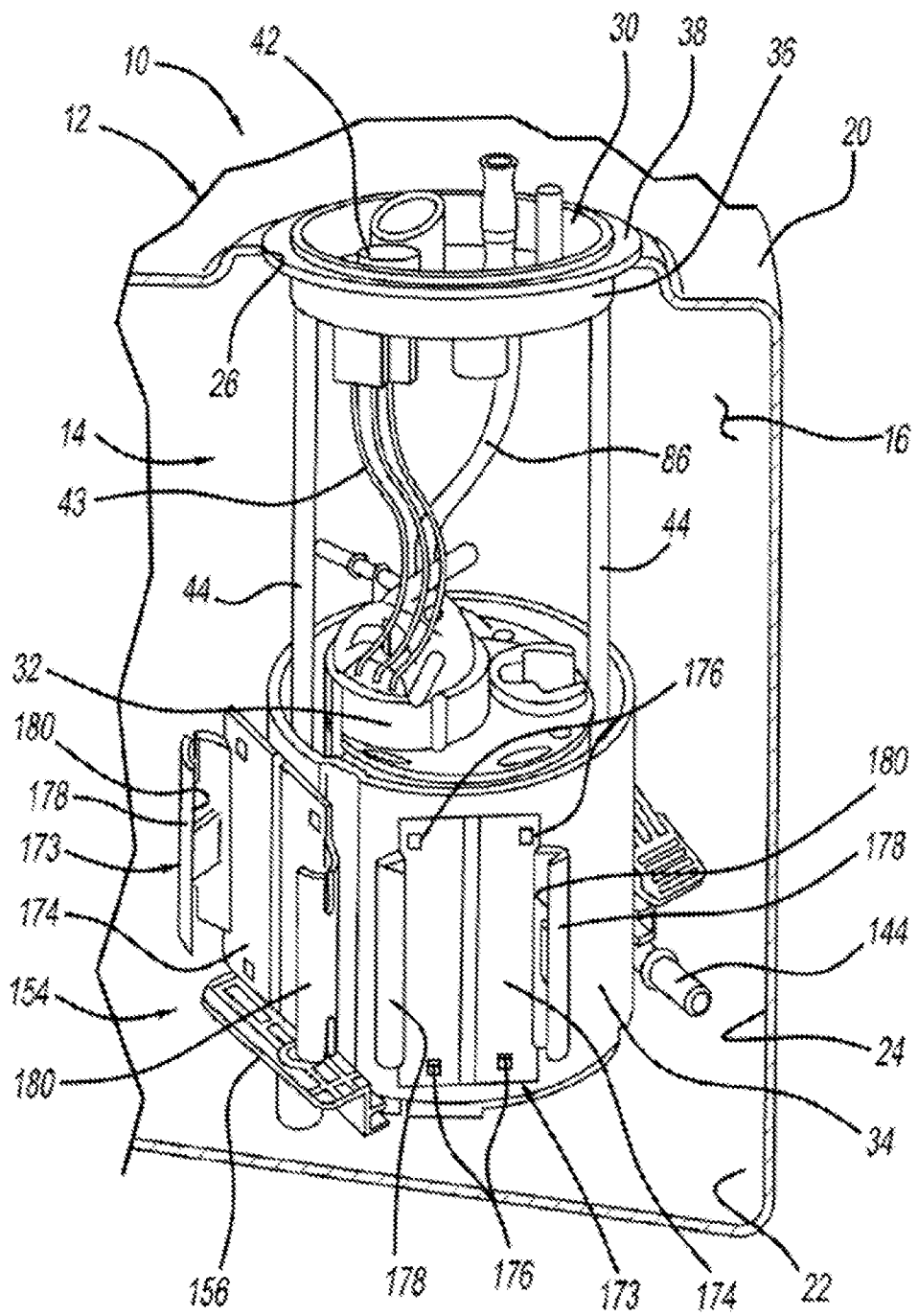
FIG. 1 is a perspective view of a fuel pump assembly shown mounted in a fuel tank in which a portion of the fuel tank is shown in section in accordance with an exemplary embodiment.
Figure 2:
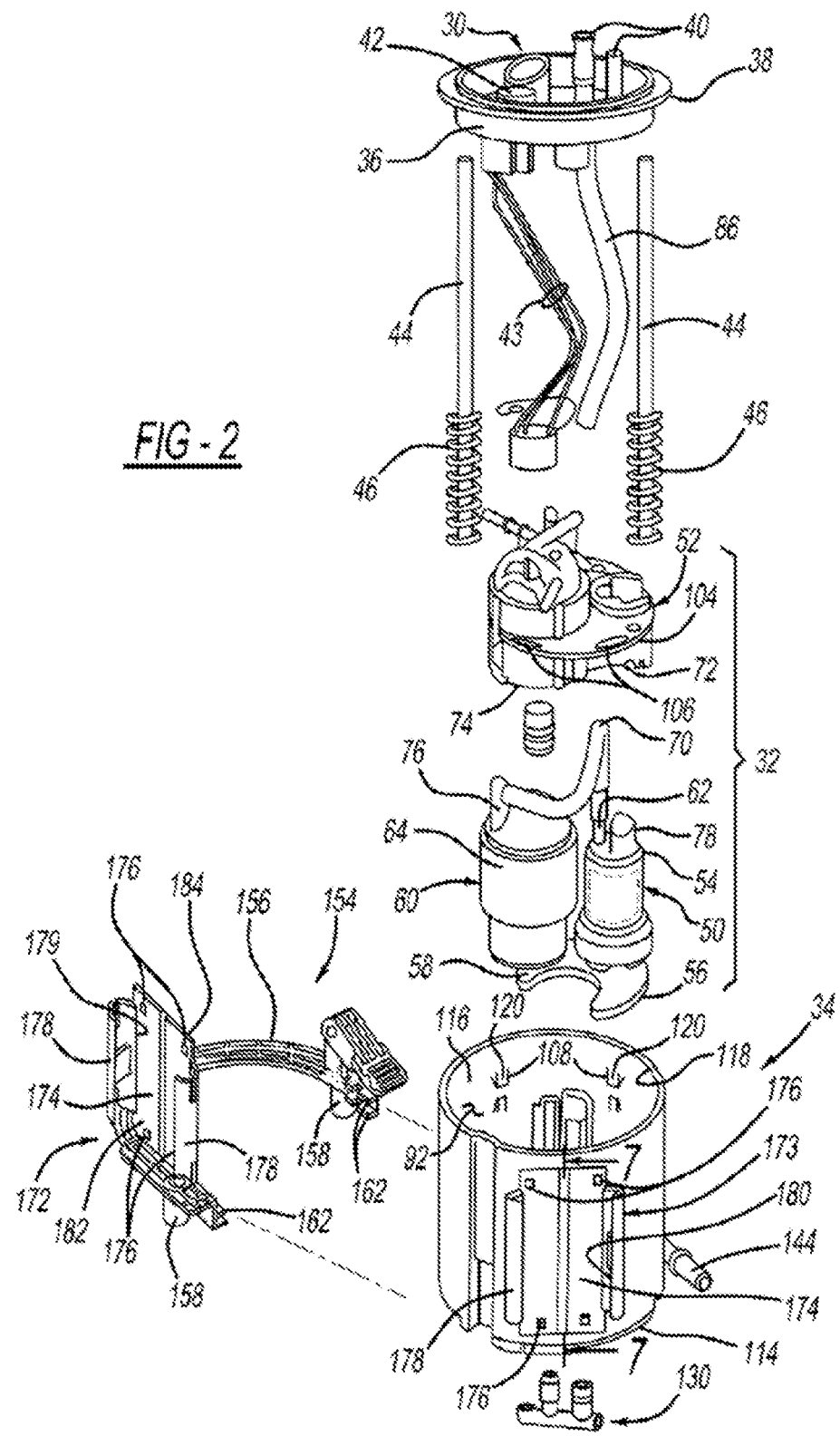
FIG. 2 is an exploded view of the fuel pump assembly of FIG. 1.
Figure 3:
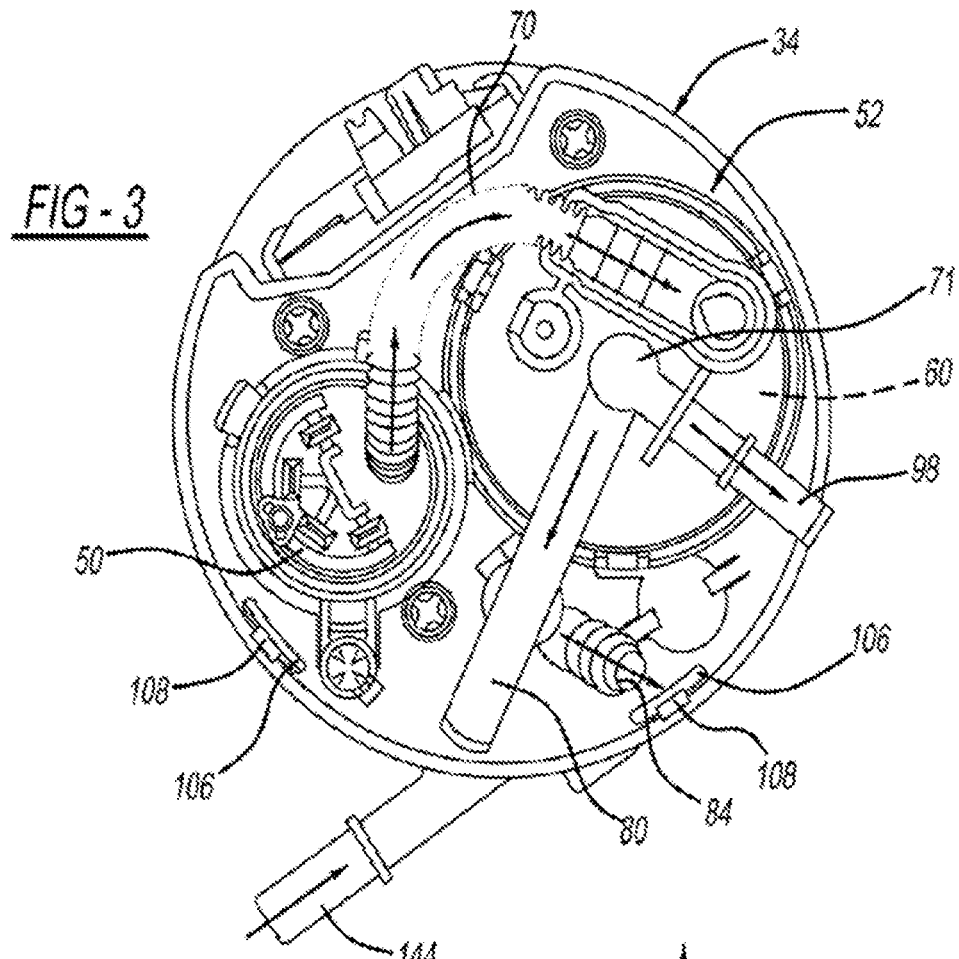
FIG. 3 is a plan view of a portion of the fuel pump assembly in accordance with an exemplary embodiment.
Figure 9:
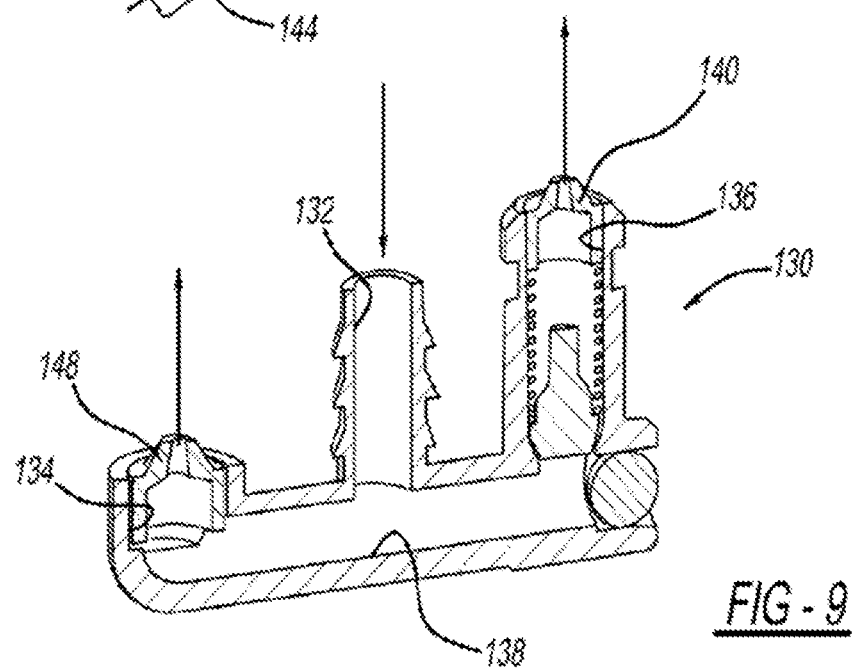
FIG. 9 is a sectional view of a manifold in accordance with an exemplary embodiment.

Referring now to FIGS. 1 and 2, a fluid delivery system 10 is shown comprising a fuel tank 12 and a fuel pump assembly 14. The fuel tank 12 may be any suitable container for retaining a supply of fuel to be delivered from the tank to an engine by the fuel pump assembly 14. While the entire tank is not illustrated, it should be appreciated that the tank 12 may have any desired shape with one or more walls that define an interior volume 16 is which fuel is retained. In the implementation shown, the tank includes upper and lower walls 20, 22 interconnected by sidewalls 24. The upper wall 20 has an opening 26 therethrough so that at least a portion of the fuel pump assembly 14 may be received within the interior volume 16.

As shown in FIGS. 1 and 2, in accordance with an exemplary embodiment, the fuel pump assembly 14 may comprise a mounting flange 30, a cartridge 32, and a reservoir or receptacle 34. The mounting flange 30 may have a disc-like body 36 with a peripheral rim 38 adapted to overlie and be sealed to the tank at the opening 18. In addition, the flange 30 may have a number of other features, including fuel passages, fuel nipples or fittings 40, tank vents, passage(s) 42 for electrical wires 43 or an electrical connector, electronic circuitry, etc., enabling electrical and/or fluid (e.g., fuel, air, etc.) communication therethrough. One or more supports 44 may interconnect the flange 30 and the reservoir 34 and/or cartridge 32; e.g., in the illustration, the supports 44 include guide rods and biasing members, such as coil springs 46, that yieldably bias the pump assembly 14 against the bottom of the fuel tank 12.

As shown in FIGS. 1-8, in accordance with an exemplary embodiment, the cartridge 32 is adapted to be received within or carried by the reservoir 34 and may include a fuel pump 50, one or more fuel filters and a housing 52. The pump 50 may be an electric motor driven pump, a fluid driven pump, or any other like suitable device capable of drawing fuel from the tank 12, pressurizing the fuel and delivering it to the engine. The pump 50 may include a housing 54 and a motor and pumping element within the housing. The pumping element may be of any suitable type, such as but not limited to, positive displacement elements like gerotors, or one or more turbine style pump impellers. The pump 50 may further include an inlet that communicates with an inlet filter 56 that may be mounted to the fuel pump to filter fuel before the fuel enters the fuel pump. The inlet filter 56 may include a bracket or other support feature 58 to retain a lower end of an outlet filter 60 that receives fuel discharged from an outlet 62 of the fuel pump 50 and provides additional filtration of that fuel. In this way, the fuel pump 50 takes in fuel through the inlet filter 56, pressurizes the fuel, and discharges the fuel through the outlet 62 whereupon the fuel is routed to the outlet filter 60.

The outlet filter 60 has a casing 64, a filter element 66 within the casing (FIGS. 4 and 6), an inlet 68 that receives fuel from the fuel pump 50 (such as through an interconnecting conduit 70) and communicates the fuel with the filter element, and an outlet 71 from which filtered fuel exits the outlet filter 60. The outlet filter 60 may provide additional and finer filtration of the fuel as may be required for downstream components like fuel injectors. As shown, the casing 64 is generally cylindrical and the filter element 66 may be annular or cylindrical or of any suitable shape or style. In the implementation shown, the filter element 66 is a hollow cylinder of filter material and the inlet 68 of the filter casing 64 communicates with the exterior of the filter element 66 while the outlet 71 of the filter casing 64 communicates with the interior of the filter element. Fuel flows through the filter element 66 from the exterior to the interior before being discharged from the outlet.

The cartridge housing 52 may receive, support and/or carry the pump 50 and the outlet filter 60. As shown (e.g. in FIGS. 2 and 4-6), the housing 52 may have one or more couplers, which are shown as two downward-facing cavities 72, 74, respectively sized to receive an upper portion 76 of the outlet filter casing 64 and an upper portion 78 of the pump housing 54. In addition, the cartridge housing 52 may be configured to receive or otherwise accommodate the hose 70 (e.g., with a suitably shaped recess). In this embodiment, the pump 50 and outlet filter 60 are located side-by-side, generally parallel and in the same longitudinal orientation; however, this is merely an example.

Figure 6:
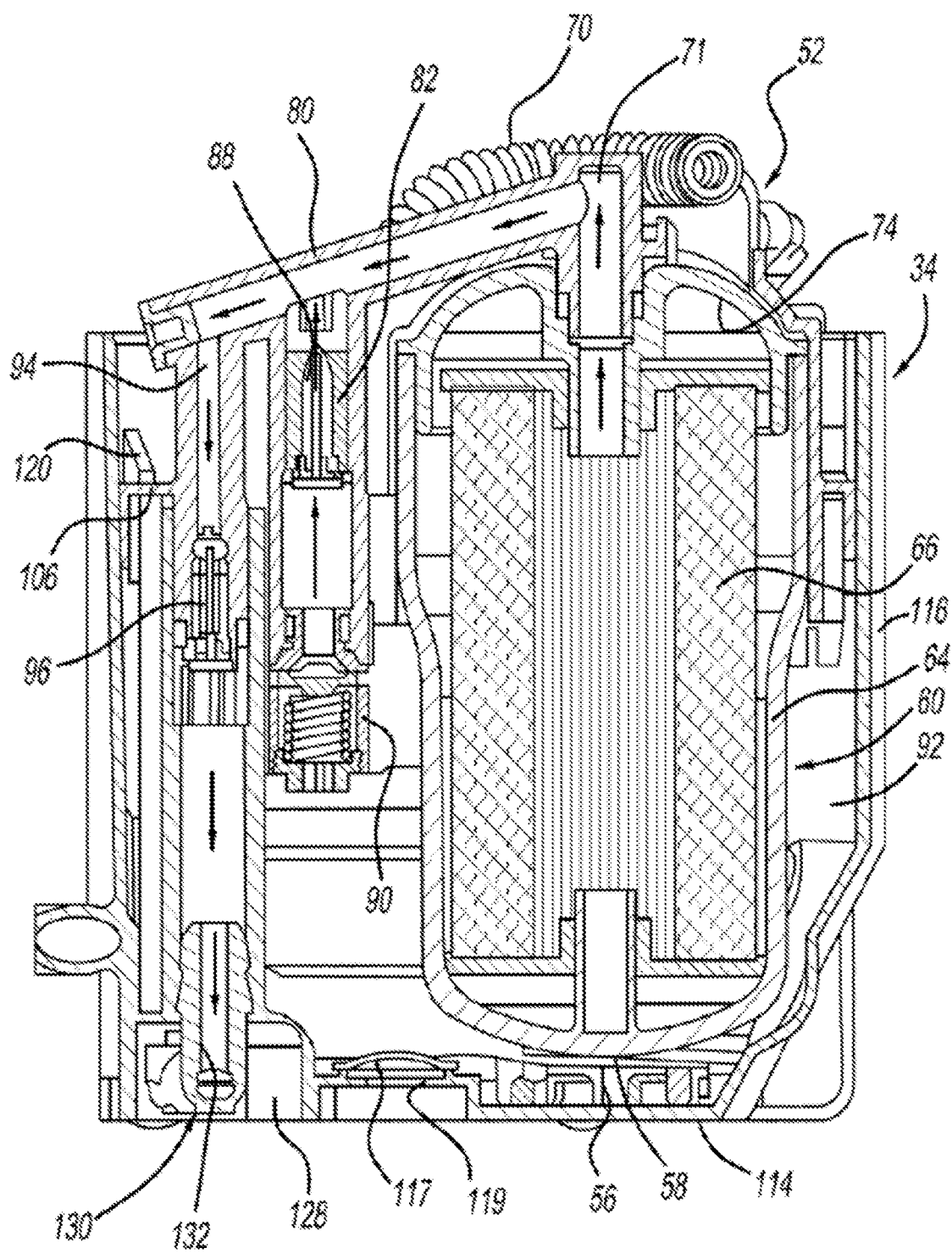
FIG. 6 is another sectional view of the fuel pump assembly in accordance with an exemplary embodiment.
Figure 7:
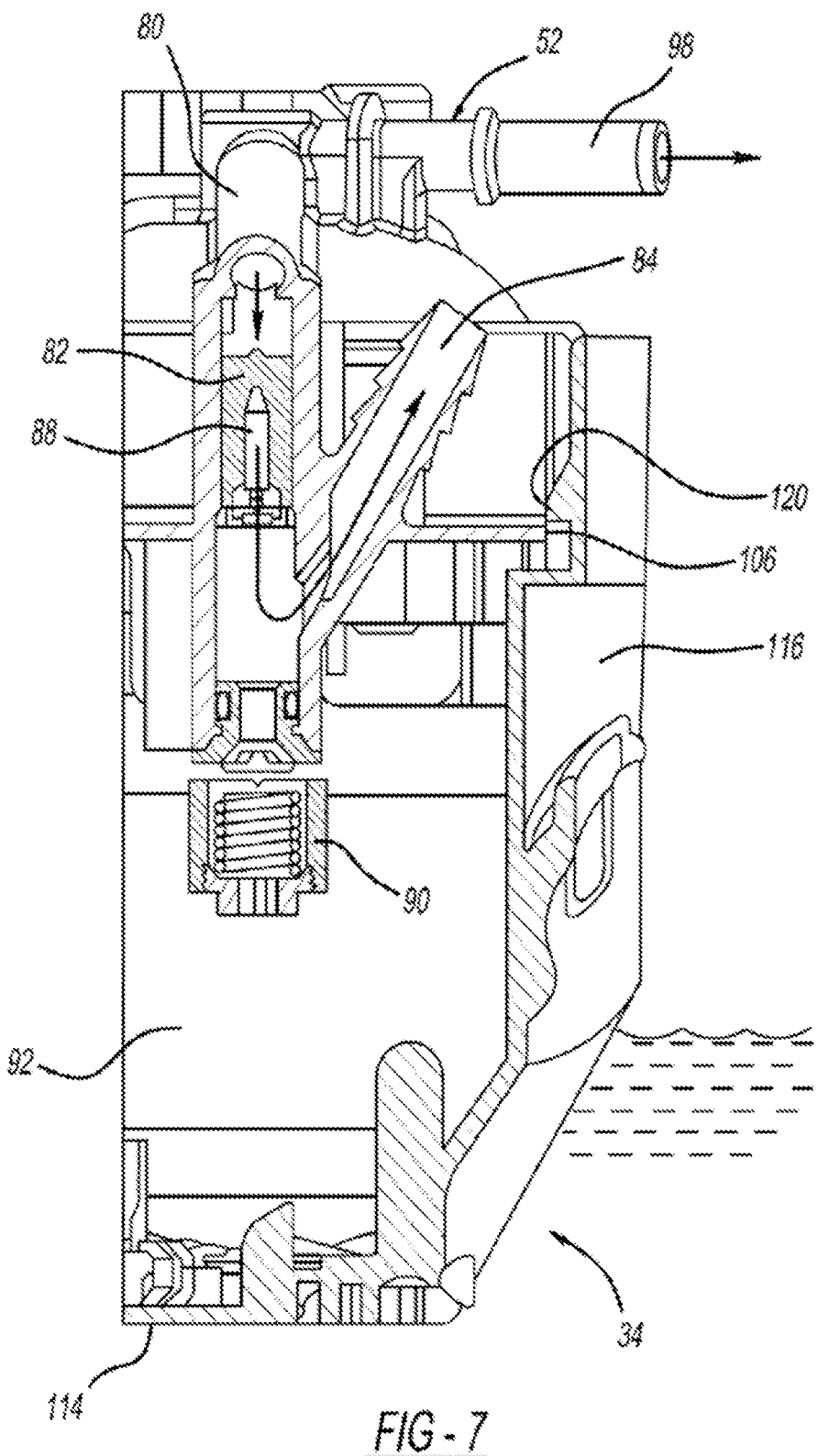
FIG. 7 is a partial sectional view of the fuel pump assembly in accordance with an exemplary embodiment.

The cartridge housing 52 may also define part of or communicate with one or more fuel circuits that receive fuel from the outlet of the outlet filter 60 and distribute or route the fuel as desired. In the implementation shown, a first fuel circuit routes fuel to the engine through a first supply passage 80 that branches off from the filter outlet 71 and leads to a branch passage 82 defined at least partially within the housing 52 that leads to an outlet nipple 84 at least partially formed in the housing 52 that in turn leads to a conduit 86 connected to the nipple 84 and a passage 40 through the mounting flange 30. As shown in FIGS. 6 and 7, the first fuel circuit may include a check valve 88 in or in communication with the first supply passage 80 or some portion of the fuel flow from the first supply passage. This may, for example, hold pressure in the system downstream of the pump, when the pump is not operating. An overpressure valve 90 may also be in or in communication with the first supply passage to limit the maximum pressure of fuel discharged from the first supply passage and subsequently delivered to the fuel rail or engine. Fuel above a threshold pressure may be routed by the overpressure valve 90 back into the fuel tank or the reservoir. Fuel that flows through the pressure regulator 88 but not through the overpressure valve 90 is routed to the engine through the nipple 84, conduit 86 and a fuel passage 40 through the mounting flange 30.

A second fuel circuit routes fuel from the filter outlet 71 to one or more secondary fuel pumps that pump fuel from the tank 12 into the reservoir interior 92, as will be described later. In the implementation shown (e.g. in FIGS. 5, 6 and 8), the second fuel circuit also communicates with or is defined in part by the first supply passage 80. Fuel in the first supply passage 80 that does not flow into the first branch passage 82 flows into a second branch passage 94 that may be formed at least partially within the housing and which defines part of the second fuel circuit. A valve 96 may be carried by the housing 52 or otherwise communicated with the second branch passage 94 to prevent or at least limit fuel flow therethrough to prevent fuel from siphoning up through the pump and out of the jet orifices. The first supply passage 80 and the first and second branch passages 82, 94 may be integrally formed in the cartridge housing 52 such as by molding the housing from plastic with all of the features of the housing formed in the same piece of material, if desired. Otherwise, one or more of the passages 80, 82, 94 may be defined by conduits or tubes separately joined to the housing 52 either permanently or removably, as desired.

Figure 4:
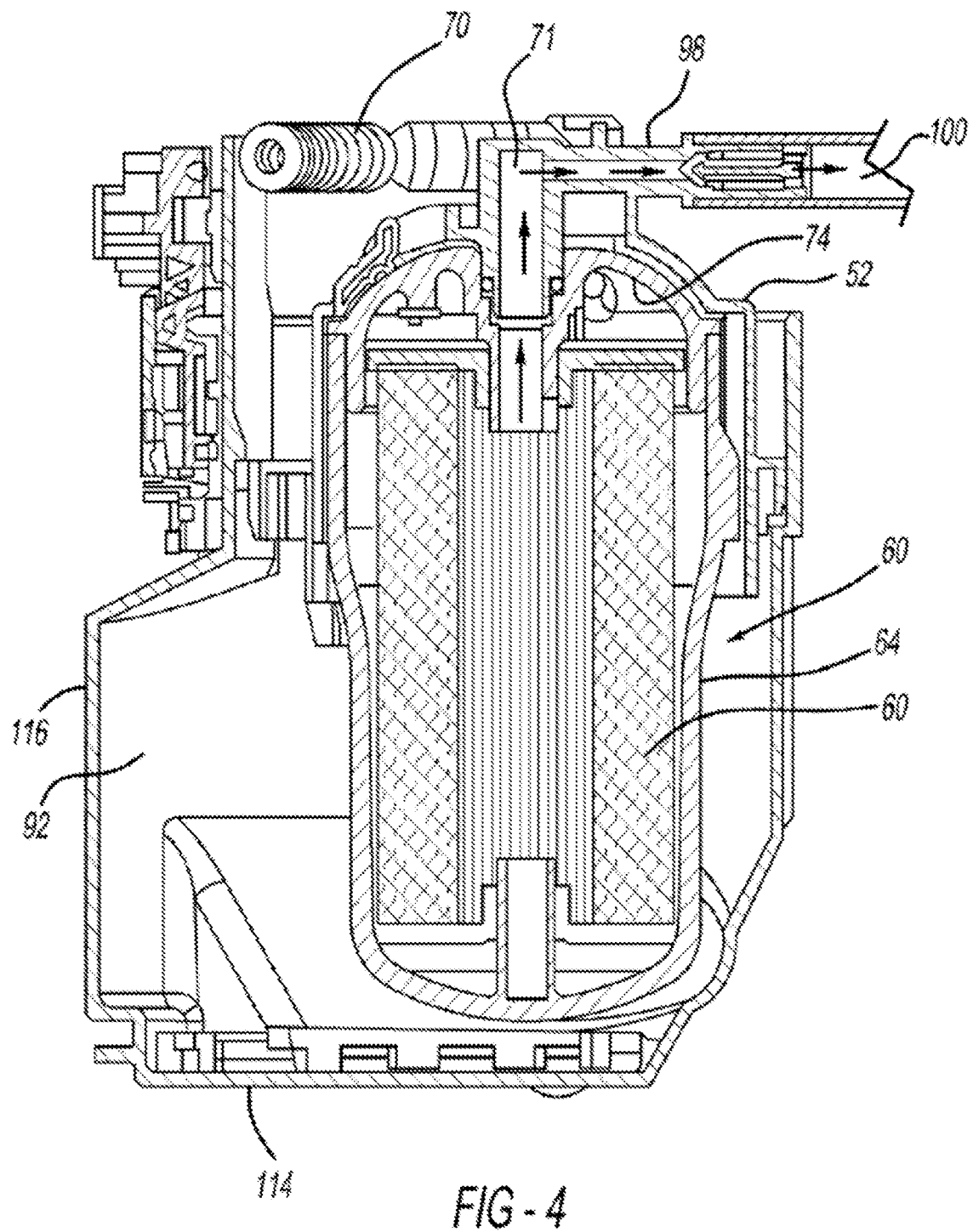
FIG. 4 is a sectional view of the fuel pump assembly in accordance with an exemplary embodiment.
Figure 5:
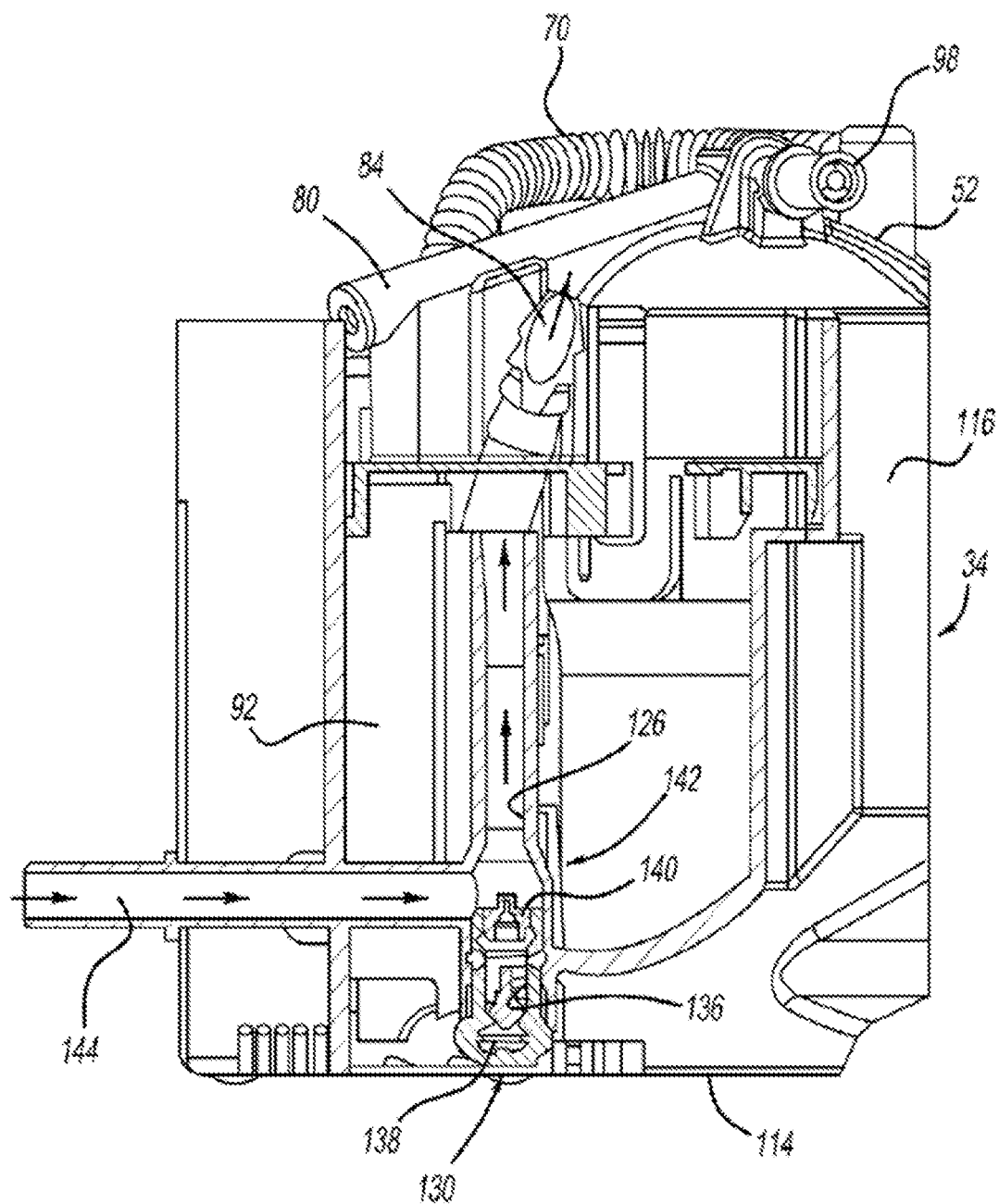
FIG. 5 is another sectional view of the fuel pump assembly in accordance with an exemplary embodiment.

A third fuel circuit may be provided to drive a remotely located secondary pump, such as a jet pump located in a remote area of the fuel tank (not shown). The third fuel circuit may include a second supply passage 98 that branches off from the filter outlet 71 as shown in FIGS. 4, 5 and 7. The second supply passage 98 may include or be defined in part by a nipple adapted to receive a conduit 100 (FIG. 4) that communicates with a remote jet pump. A check valve may be provided in the second supply passage to prevent siphoning of other reverse fuel flow therethrough. If a remote jet pump or other use for the second supply passage is not included in a particular application in which the fuel pump assembly is used, the second supply passage 98 may be plugged or not provided. Designing the second supply passage 98 so that it may be plugged when not needed may increase the utility of a given housing 52 in that it may be used in different fuel pump assemblies whereas forming different housings (one that includes the second supply passage and another which does not) may be more costly among a range of fuel pump assemblies.

The cartridge housing 52 may be connectable to the reservoir 34 with the fuel pump 50, inlet filter 56 and outlet filter 60 received within the reservoir interior 92. In at least some implementations, the housing 52 includes one or more connecting features 102 to couple the cartridge 32 to the reservoir 34. In the illustrated embodiment, the connecting features 102 include an axially extending flange 104 or skirt with one or more snap-fit or interference fit connection features 106. By ways of non-limiting examples, the connection feature(s) 106 may include tabs, openings or detents, catches, clips, clasps, snaps, or the like. As shown, the connection features 106 include a flexible finger 108 extending outboard of and defining part of an opening 110. The finger 108 may flex relative to the opening 110 to pass a catch or tab and then resiliently return toward its unflexed state to be overlapped by the tab. The connection features 106 may also simply include a flange, rim, shoulder, void (slot, opening, detent, recess) or other feature that receives, is overlapped by or is received in a feature of the reservoir to connect the housing to the reservoir. The connection features 106 may be integrally formed with the housing 52 as molded-in features, or they may be separately formed and attached to the housing, by way of non-limiting examples. In at least some implementations, the connection features 106 mate with, overlap or otherwise cooperate with complementary connection features 108 on the reservoir 34 to connect the housing 52 to the reservoir 34 by a snap-fit or interference fit.

Figure 10:
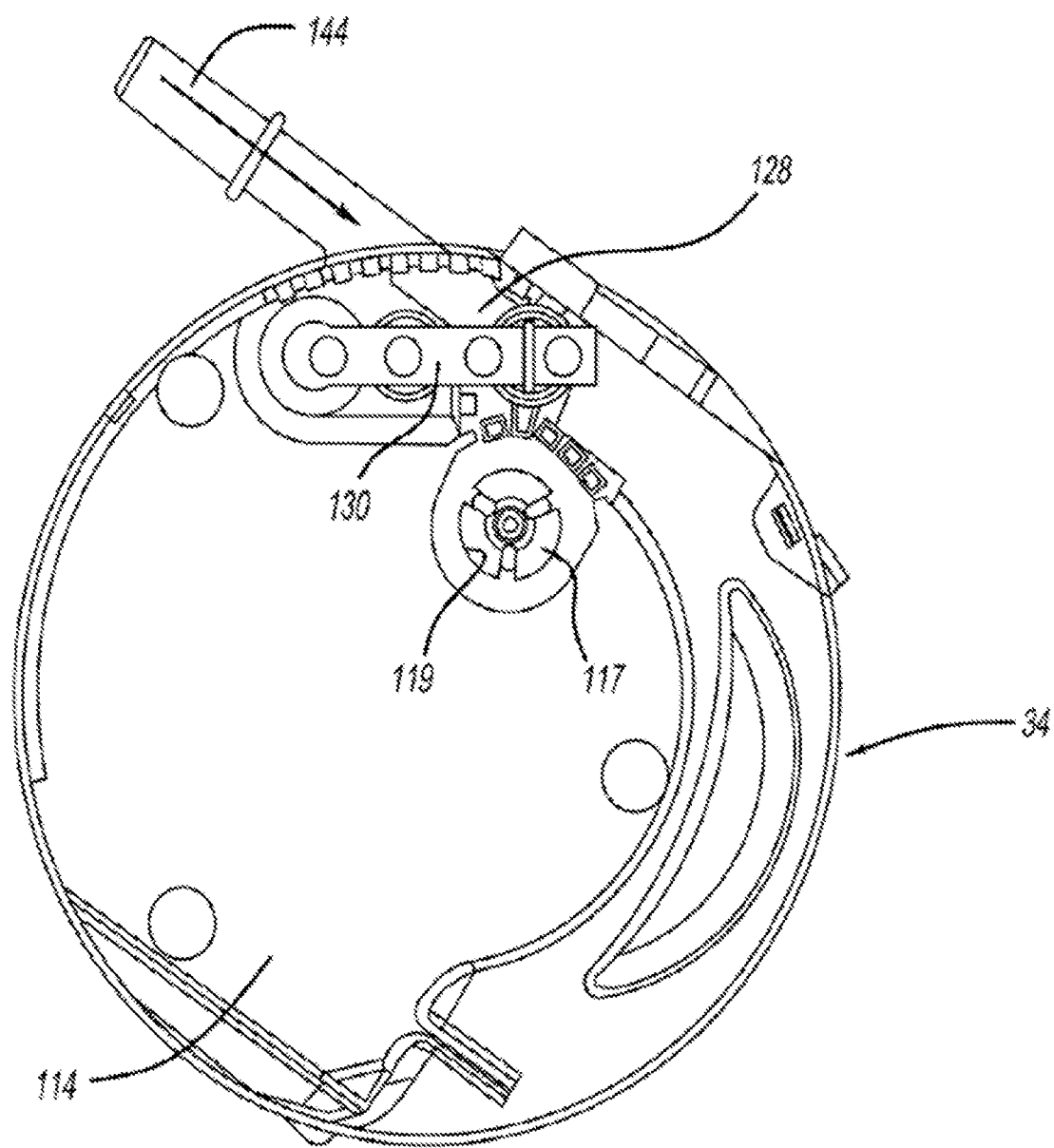
FIG. 10 is a bottom view of a portion of the fuel pump assembly in accordance with an exemplary embodiment.

One embodiment of the reservoir 34 is shown in FIGS. 1-8, 10 and 11. The reservoir 34 may a body with a base or bottom 114 and an adjoining side wall 116. The bottom 114 and side wall 116 define a generally cup-shaped interior 92 for retaining a volume of fuel at least somewhat separate from the fuel in the tank 12 and readily available to the fuel pump 50. This may provide a supply of fuel to the fuel pump inlet in at least certain circumstances that may otherwise cause an interruption in the availability of fuel from the tank 12, such as when, under low fuel level conditions, the fuel sloshes away from the pump 50 due to a vehicle cornering or inclination. A fill valve 117, as shown in FIGS. 6 and 10, may be provided in or near the bottom 114 of the reservoir 34 to permit fuel to enter the reservoir interior 92 while preventing fuel from exiting the reservoir therethrough. In the implementation shown, the fill valve 117 is an umbrella-style valve that overlies a reservoir inlet 119. An interior surface 118 of the reservoir (e.g., on the side wall 116) may have one or more connection features 108 adapted to mate with or otherwise cooperate with the connection feature(s) 106 of the cartridge housing 52 (see e.g. FIGS. 2, 6, 7 and 11). For example, in one embodiment, the connection features 108 may include one or more ramp-like protrusions 120 that extend axially and are inclined radially inwardly as the extend toward the bottom 114. Several protrusions 120 may be circumferentially spaced from one another about the interior surface 118 of the side wall 116. Other implementations are also possible; e.g., including connection features of different shapes and sizes, or connection features on the bottom 114, just to name a couple examples.

During assembly, a shoulder, portion including a void or other connection feature 106 on the housing 52 may be moved over an inwardly facing surface of the protrusions 120 as the housing is inserted into the reservoir 34 and then snap-in beneath a shoulder defined by the protrusions 120 so that a portion of the housing 52 is overlapped by the shoulder. The height of the protrusions 120 may be varied for different applications depending on the size of the fuel pump 50 and/or fuel filter 60 being received in the reservoir 34, or for other reasons, including but not limited to use of different size reservoirs. In at least some implementations, the same mounting flange 30, supports 44, housing 52, fuel pump 50, fuel filters 56, 60, valves 88, 90, 96, 117 and the like may be used with reservoirs 34 of different height to enable use of mostly common components among different fuel pump assemblies 14 to reduce the cost of a range of fuel pump assemblies. In this way, different tank sizes and different reservoir volume requirements can be met with many of the same components to reduce product cost for a range of customer applications. Further, common fuel passages and other features may facilitate design, manufacture and assembly of a range of fuel pump assemblies with common fuel routing and valve arrangements used among different fuel pump assemblies.

Figure 8:
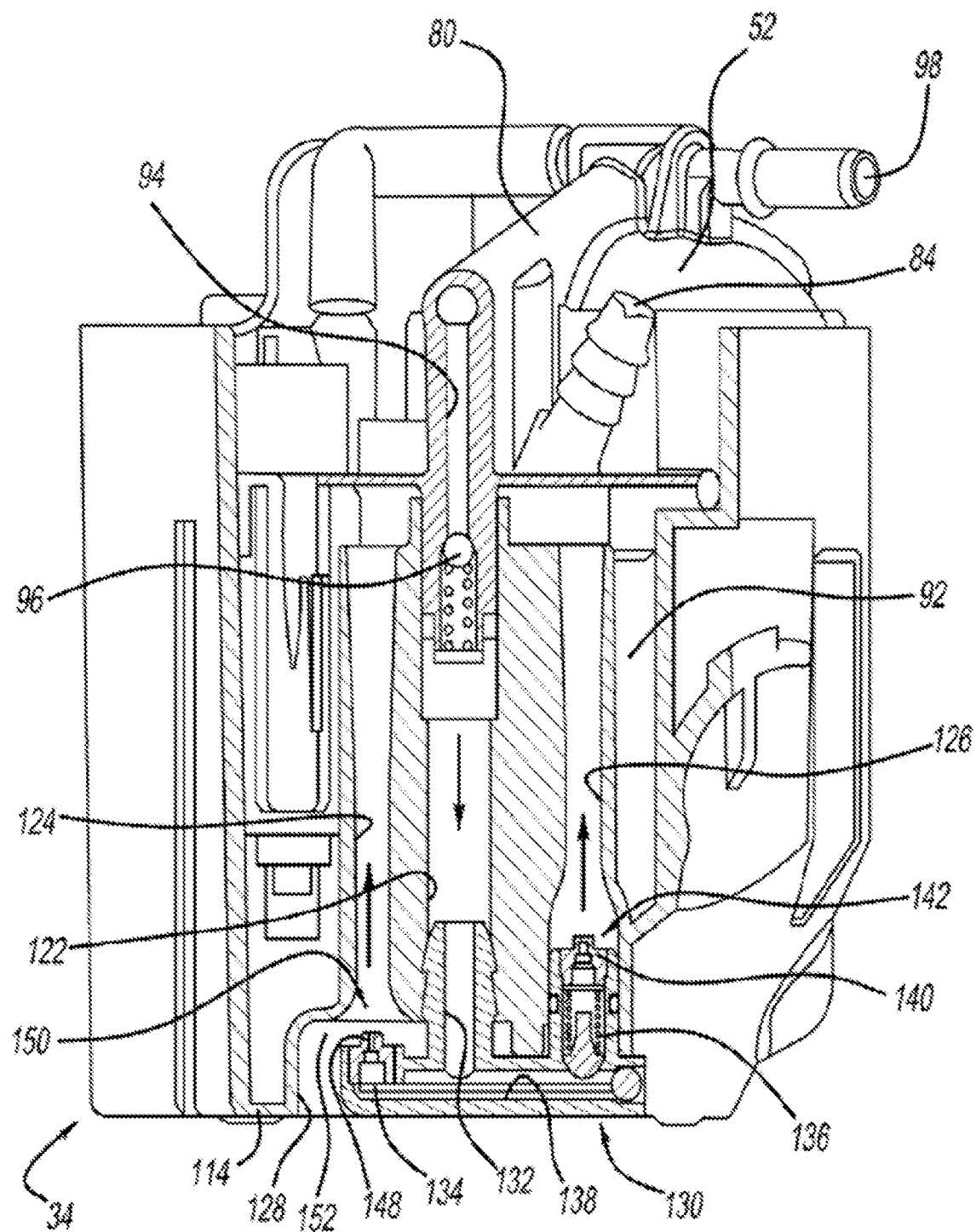
FIG. 8 is another sectional view of the fuel pump assembly in accordance with an exemplary embodiment.

As shown in FIGS. 5 and 8, the reservoir 34 may have or communicate with a plurality of passages that define part of one or more of the fuel circuits. In the implementation shown, the reservoir 34 has an outlet passage 122 and two inlet passages 124, 126 that extend through the reservoir to or adjacent to the bottom 114 of the reservoir. At or adjacent to the bottom 114 of the reservoir 34 and open to the passages 122-126, the reservoir 34 may include a receptacle 128 adapted to receive a manifold 130 (FIGS. 2, 5, 8 and 9). In more detail, the outlet passage 122 in the reservoir 34 defines part of the second fuel circuit and is communicated at one end with and receives fuel from the second branch passage 94 of the housing 52. The outlet passage 122 routes that fuel to an inlet 132 of the manifold 130 which in turn routes that fuel to two manifold outlets 134, 136 via a common manifold passage 138. As is described in more detail below, the manifold outlets 134, 136 route fuel into the reservoir 34 through the two inlet passages 124, 126.

The manifold inlet 132 may be defined at least in part by a tubular nipple adapted to be received within or communicated with the second branch passage 94 of the housing via the outlet passage 122 in the reservoir 34. Manifold outlet 134 may defined by a tubular nipple in communication with the common manifold passage 138 to receive fuel flowing through the manifold inlet 122. The outlet 136 may include a jet or nozzle 140 that defines part of a jet pump 142 so that the discharge of fuel from the nozzle 140 creates a pressure drop in the area of a reservoir inlet 144 to draw fuel from the tank 12 into the reservoir 34. In some implementations, the fuel may be drawn from a location of the fuel tank 12 spaced from the reservoir 34, such as in a different compartment or portion of a saddle shaped fuel tank that, at least at lower fuel levels, may be separated from the portion of the fuel tank including the pump assembly 14. The fuel may be drawn through a conduit that has one end in the remote tank location and its other end coupled to the reservoir inlet 144 communicated with the manifold outlet 134, as shown in FIG. 5. Manifold outlet 134 may also include a jet or nozzle 148 that defines part of a jet pump 150 that, during operation, also fills the reservoir 34 with fuel. This jet pump 150 may draw fuel from a portion of the fuel tank adjacent to the reservoir 34, such as through an opening 152 between the reservoir 34 and manifold 130, in the area of the receptacle 128. To improve the efficiency of the jet pumps 142, 150 the reservoir inlet passages 124, 126 may include converging and or diverging portions to provide a desired pressure differential in use, if desired.

If either jet pump 142, 150 is not needed in a particular application, the corresponding manifold outlet 134 can be plugged or capped which allows use of the same manifold 130 in a wide range of applications. For example, while the manifold outlet 136 is shown as having the nozzle 140 for jet pump 142, as noted above, fuel may be pumped to the reservoir by a remotely located jet pump driven by fuel discharged from the outlet filter 60. In that case, the nozzle 140 in manifold outlet 136 might not be needed and instead, fuel pumped from the remotely located jet pump may be discharged into the reservoir (e.g. into the top of the reservoir) without any nozzle or jet needed in manifold outlet 136. Further, the nozzles 140, 148 may be formed separately from the manifold 130 and inserted therein, such as by a press-fit, threaded interface or in any other suitable way. This permits the same manifold 130 to be readily usable with different nozzles to again, among other things, increase the utility of the same manifold in a wide range of applications.

Figure 11:
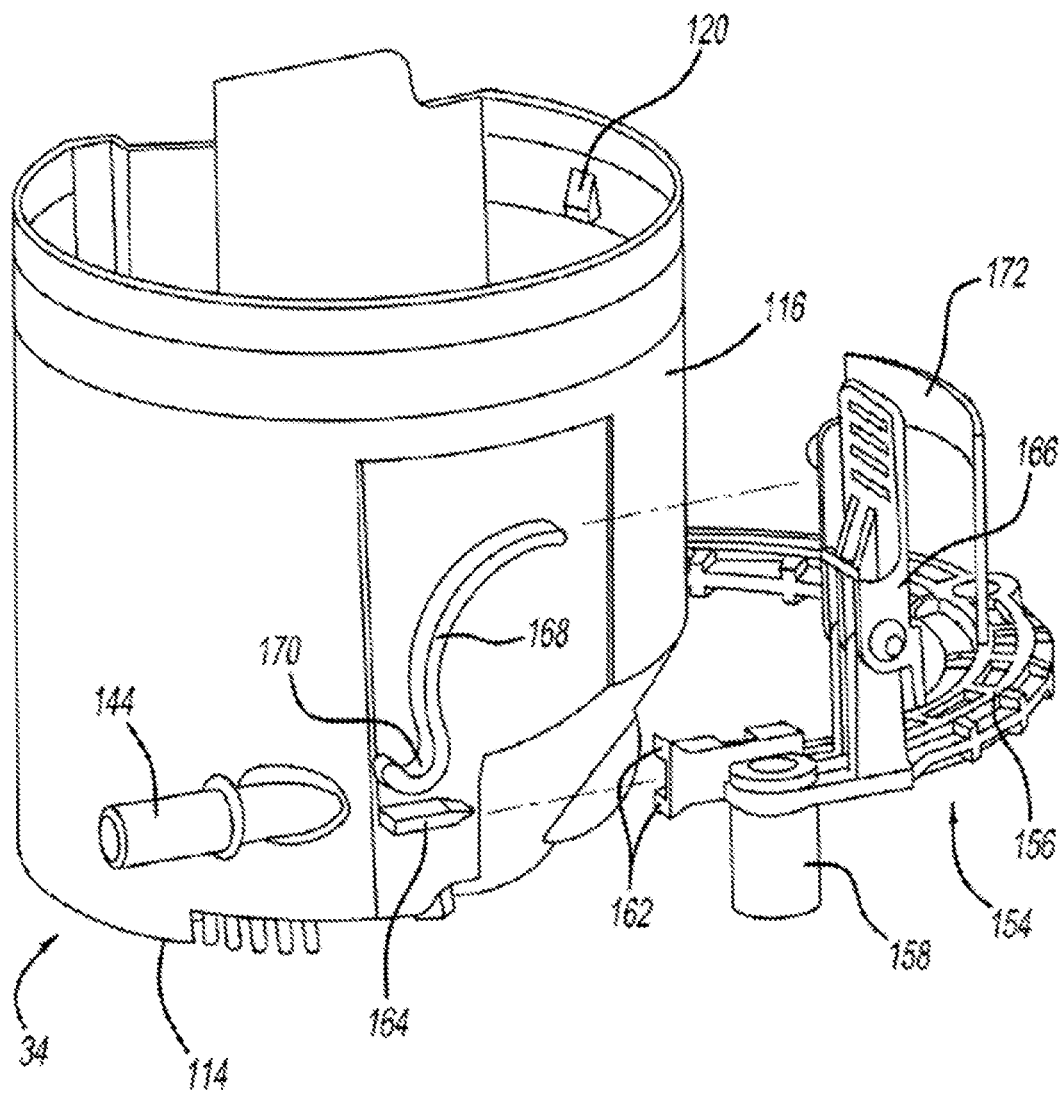
FIG. 11 is a perspective view of a reservoir and mounting bracket in accordance with an exemplary embodiment.
Figure 13:
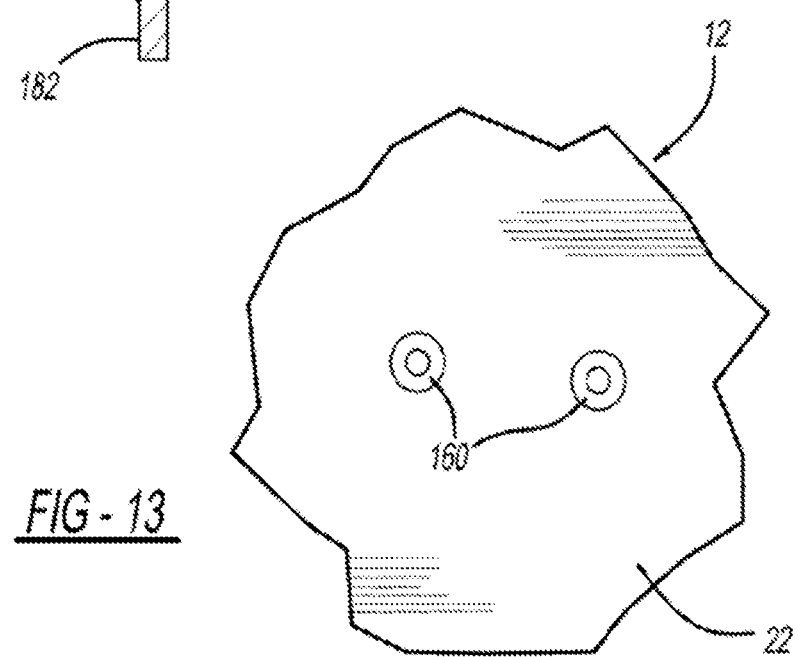
FIG. 13 is a fragmentary plan view of a portion of the fuel tank in accordance with an exemplary embodiment.

As shown in the implementation of FIGS. 1 and 2, the reservoir 34 may include one or more supporting elements 154. Supporting elements 154 may be any suitable element (such as feet or flanges connected to the tank, brackets, mounts, etc.) to minimize movement of the reservoir 34 in the fuel tank 12 and may be used in combination with or instead of the support rods 44. In FIGS. 1, 2 and 11, one supporting element 154 is shown as including a bracket 156 adapted to be connected to the tank 12 and to be connected to the reservoir 34 to maintain the position of the reservoir 34 within the tank 12. The bracket 156 may have one or more tank connection features 158 adapted to mate with one or more bracket connection features 160 (e.g. as in FIG. 13 or otherwise) carried by the tank 12, such as by being formed in the tank while the tank is formed, or by being subsequently connected to the tank (e.g. by snap-fit, friction fit, weld, adhesive, clamp, mechanical fastener, etc). In the example shown, the bracket 156 is generally C-shaped and includes two tank connection features 158 shown as two feet or posts 158 that engage the tank connection features. The posts 158 may be sized and spaced on the bracket 156 so that they may be received within recesses on the bottom of the tank 12, or they may be snap-fit in or over other bracket connection features of the tank. The bracket 156 could be inserted into the tank 12 during the tank formation process, such as by being inserted into the interior of a parison being molded into the tank (and being overlapped by tank material or bonded/welded thereto), or the bracket may be provided into the tank after the tank has been formed. In the implementation shown, the bracket 156 also includes one or more reservoir connection features 160 adapted to connect the reservoir 34 to the bracket 156. In this implementation, the bracket 156 includes alignment tabs or flanges 162 that receive or overlie corresponding flanges or tabs 164 on the reservoir 34 and a lock or clamp 166 that is moveable from an open position to a retaining or closed position.

To mate with the bracket 156, the reservoir 34 includes one or more bracket connecting features. In the implementation shown, the reservoir includes one or more alignment tabs 164 and one or more clamp surfaces 168 engageable by the clamp 166 in its closed position. The clamp surface 168 is shown as being contoured or arcuate to provide a cam action that ensures proper position of the reservoir 34 relative to the bracket 156 before the clamp 166 is closed. As shown in FIG. 11, the bracket 156 and reservoir 34 may be coupled by aligning/engaging/overlapping the alignment tabs 164 and then moving the clamp 166 from its open to its closed position whereupon the clamp engages the clamp surface 168 on the reservoir 34 and pulls the reservoir into position relative to the bracket 156. Part of the clamp 166 may be received in a retention feature of the reservoir 34, shown as a hook 170 at a corresponding end of the clamp surface 168 to securely retain the clamp 166 in its closed position. The illustrated bracket 156 is merely an example; other implementations are possible.

The bracket 156 may carry one or more mounts 172 that may be used to connect a component, such as a fuel level sensor (not shown), to or adjacent to the reservoir 34. This mount 172 may be in addition to or instead of providing a mount directly on the reservoir 34. In the illustrated implementation, the mount 172 comprises a plate 174 having retention features 176 and two inwardly-facing U-shaped guides or rails 178 extending outwardly from the plate 174, generally parallel to each other and along or adjacent to side edges of the plate. Each rail 178 comprises an inner edge that adjoins the plate 174 and is spaced from an outer edge 180 that is spaced from the plate 174; the rails are configured to slidably capture and releasably retain a body or housing of the fuel level sensor (not shown).

Figure 12:
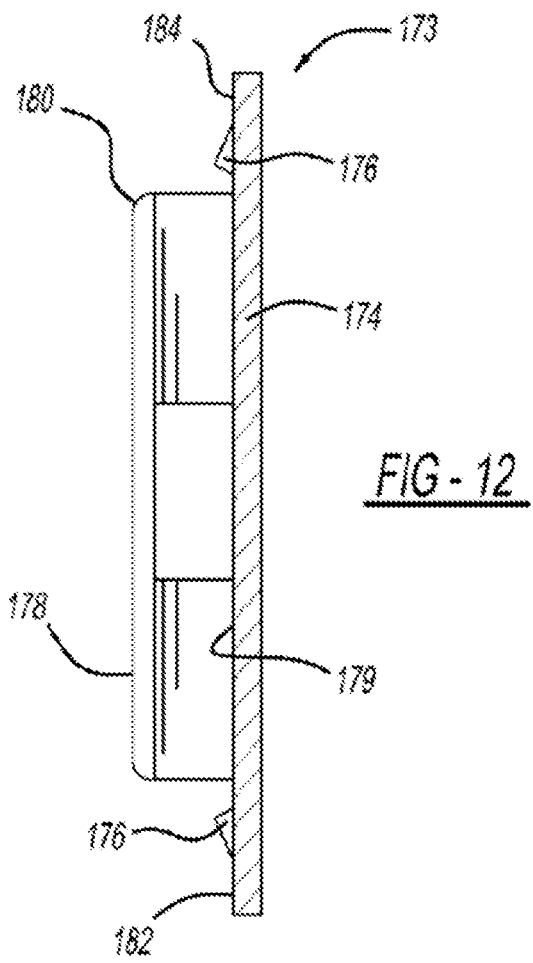
FIG. 12 is a sectional view of a mount that may be carried by the reservoir or bracket in accordance with an exemplary embodiment.

In the illustrated example, two pairs of retention features 176 are shown nearer opposed ends 182, 184 of the plate 174. As shown in FIGS. 1, 2 and 12, each retention feature 176 may have a ramp-like shape having a outwardly extending end defining a shoulder or stop surface. When two retention features 176 are provided, the outwardly extending ends may be positioned inboard of the other ends to capture corresponding features of the fuel level sensor.

The mount 172 may be configured to carry a variety of different types of fuel level sensors, or other components. For example, the level sensor may comprise a card-shaped electronics housing configured to pivotally carry an arm having a float at a distal end thereof. The card-shaped housing may be sized and configured to be slidably received between the mount rails 178 (oriented and received from end 182 or end 184). In addition, the housing may have features or pockets sized to receive the retention features 176 of the mount 172. Depending on the shape of the fuel tank 12 or the inner volume 16 of the tank, adequate space may be provided for the operative movement of the arm and float in at least one level sensor orientation. Thus, since the level sensor housing may be inverted and carried by the mount from either end (being secured by at least one of the pairs of retention features 176), different types of level sensors may be adapted to the similar fuel tanks 12. Or conversely, a common level sensor assembly may be adaptable to differently shaped fuel tanks. These of course are merely examples; other implementations are also contemplated.

While the mount 172 is shown coupled to bracket 156, it should be appreciated that other implementations are also possible. For example, the mount 172 may be carried by the cartridge 32 (e.g., via housing 52), the support elements (guide rods) 44, the mounting flange 30, or the reservoir 34. In this regard, multiple mounts may be provided on a single fuel pump assembly 142 to enable a single fuel pump assembly to be used in a wide variety of applications without modification. If desired, in each application only one mount may be used and the other mounts may be empty, or the other mounts may be used to secure other components to or relative to the fuel pump assembly. Finally, it should be appreciated that in the example where the bracket 156 is coupled directly to the fuel tank 12, mounting the level sender to the bracket may reduce tolerance stack-ups that would occur if the mount were connected to other components that are themselves connected to the bracket (e.g. the reservoir, housing 116, etc). This may permit more accurate positioning of the fuel level senders in mass production of fuel pump assemblies 14 (i.e. less deviation of the level sender position in mass production).

Figure 14:
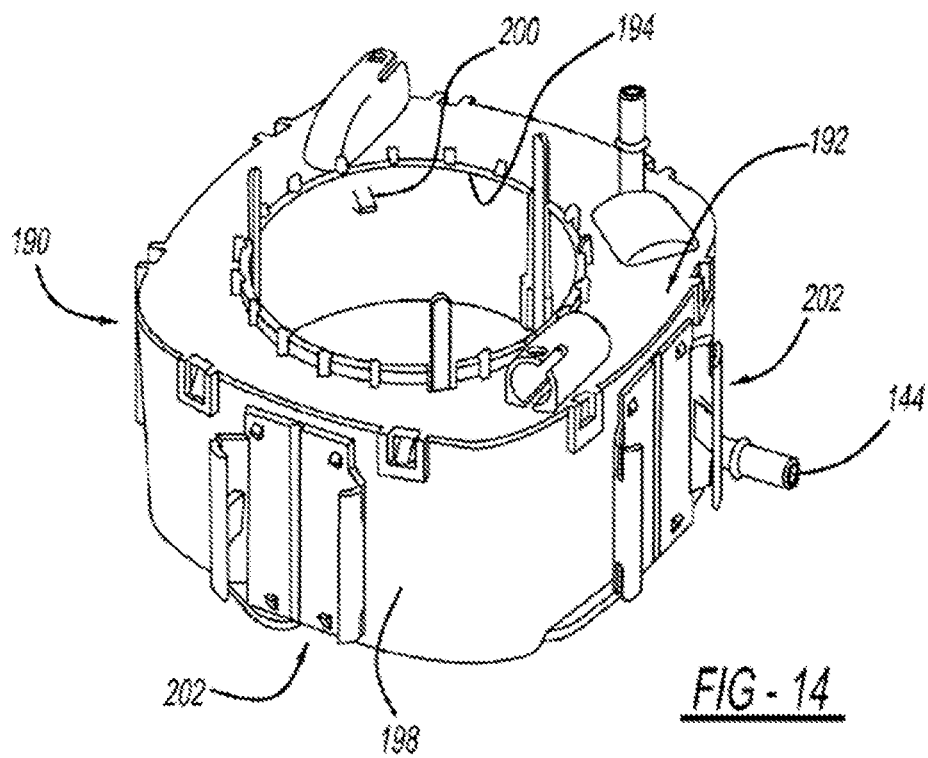
FIG. 14 is a top perspective view of a portion of a fuel pump assembly in accordance with an exemplary embodiment.
Figure 15:
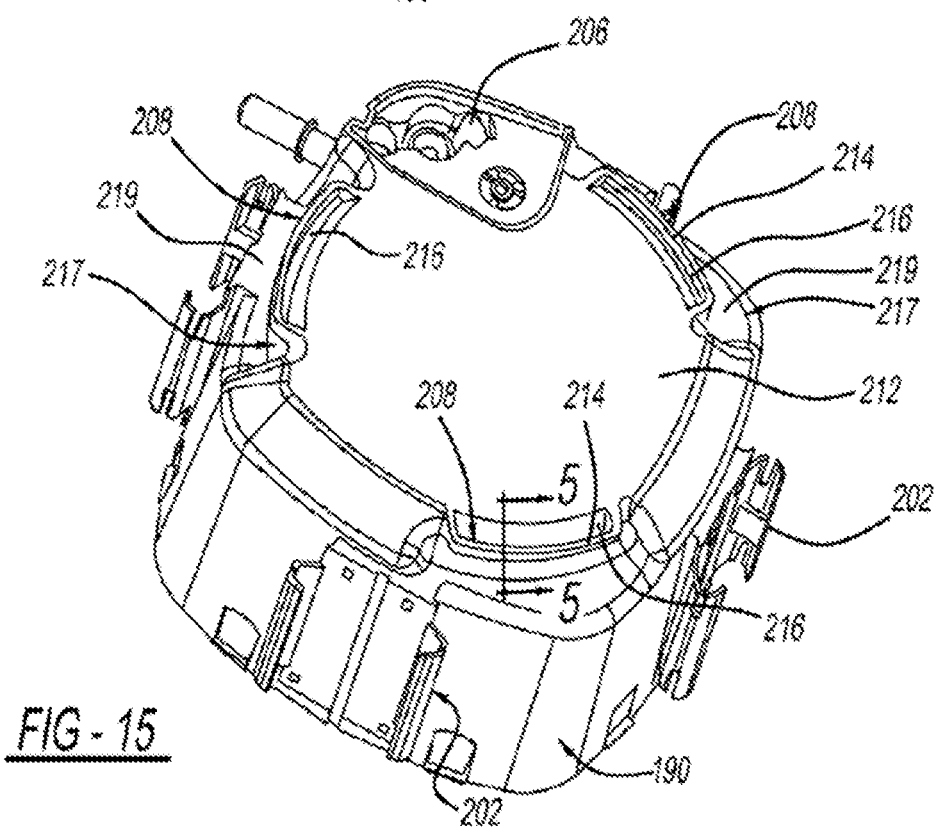
FIG. 15 is a bottom perspective view of the fuel pump assembly shown in FIG. 14.

FIGS. 14 and 15 illustrate another embodiment of the reservoir 190; here, like numerals denote like features or elements. In this embodiment, a reservoir 190 receives an insert 192 having a bore 194 therethrough that is sized to receive the cartridge 32. The insert 192 may have a number of clips 196 for coupling the insert 192 to the reservoir body or wall 198 in a similar manner to the way in which the cartridge 32 was coupled to the reservoir 34 in the fuel pump assembly 14. In at least one embodiment, the insert 192 may have one or more attachment features 200 that couple to the one or more mounting features 102 of the same cartridge 32 described above. In this way, a common cartridge 32 may be used with different reservoirs 34, 190 and in a wide range of fuel pump assemblies.

In at least one embodiment, the reservoir 190 has a different shape and may have a larger interior volume than the reservoir 34. Thus, a larger volume of reserve fuel may be carried thereby. In one implementation, the size (e.g. width) of the reservoir 190 may be larger than the width or diameter of the fuel tank opening 26 such that the reservoir 190 cannot be inserted through the fuel tank opening. This may be useful, for example, in low height tanks, or in regions of tanks 12 that have a low height wherein a taller, more cylindrical reservoir might not fit well.

FIGS. 14 and 15 illustrate that the reservoir 190 may have similar features as that of reservoir 34. For example, reservoir 190 may have multiple level sensor mounts 202 carried by or on the exterior surface 204. In at least one embodiment, four mounts 202 may be equally, circumferentially spaced therearound. Having multiple mounts on the reservoir enable the reservoir 190 to be positioned in different locations and/or orientations within the fuel tank 12, while still providing adequate space for the operative movement of the level sender (e.g., the movement of the arm and float as the level of fuel carried by the tank changes). Also, reservoir 190 may be adapted to receive the same manifold 130 in a similar receptacle 206 (described above; i.e., the same manifold 130 usable in reservoir 34).

Reservoir 190 may have supporting elements 208 as well. In the illustrated embodiment, the supporting elements 208 include one or more flexible mounting feet 210 each located near the bottom 212 of the reservoir 190. In FIG. 15, the mounting feet 210 are shown in a circumferential arrangement; however, this is merely an example. As shown in FIG. 15, each foot 210 comprises a flexible body 214 extending outwardly from the bottom 212 of the reservoir 190 with a gap 216 between the body 214 and the reservoir 190. As will be described below, at least a portion of the body 214 may be overmolded during tank formation with fuel tank material received in the gap 216 to capture the feet 210 therein. In this embodiment, the support rods 44 and mounting flange 30 are not needed although they still could be used if desired.

The first embodiment fuel delivery system 10 may include the fuel pump assembly 14 and the fuel tank 12 which may be manufactured by any suitable process. If desired, support features may be formed in the tank 12 to assist in receiving and retaining the reservoir 34 in the tank. The fuel tank opening 26 may be cut or otherwise provided in the tank 12 and the pump assembly 14 can be inserted into the fuel tank 12 through the opening 26. The bracket 156 may be connected to the tank if, and as desired. Otherwise, when the mounting flange 30 is coupled to the tank 12 covering the tank opening 26, and the guide rods 44 and associated springs 46 may bias the reservoir 34 against the bottom of the tank 12.

In other implementations, the reservoir 34, 190 may be mounted within the fuel tank 12 during formation of the fuel tank. In such implementations, the cartridge 32 may be within the reservoir 34, 190 or it may be connected to the reservoir after the fuel tank 12 is formed. A flange 30 may still cover an opening 26 in the tank 12, to provide access to the reservoir 34, 190 for connection of fluid lines and/or electrical wires. The flange 30 may, but need not be, connected to the reservoir 34, 190 or cartridge 32 as in the fuel pump assembly 14 shown in FIGS. 1-12. When the reservoir 34, 190 is connected to the tank 12 as the tank is formed and, therefore, does not need to be inserted through an opening 26 in the tank 12, any tank opening can be made smaller and hence, a smaller flange can be used. Further, the fuel and vapor lines and electrical wires may be routed through an opening of the tank 12 provided for a different reason, such as an opening through which fuel is added to the fuel tank. This may reduce the number of openings provided in the tank 12.

To connect the reservoir 34, 190 to the fuel tank 12 during the formation process, the reservoir 34, 190 may be inserted into the interior of a molten parison from which the fuel tank is formed. In at least some implementations, a portion of the reservoir 34, 190 may be overlapped by molten tank material to connect the reservoir to the tank material. As noted above, the reservoir 34, 190 may include flexible mounting feet 210 that are overlapped by tank material. This may be done, for example, by movable sliders provided in a mold in which the tank is formed, wherein the sliders push tank material over the feet and/or into the gaps defined by the feet. Some ways of doing this are shown and described in more detail in U.S. Pat. No. 8,377,368, incorporated herein by reference in its entirety. In this way, when the parison material hardens the reservoir 34, 190 is connected to the formed tank 12. The flexible feet 210 may flex relative to the reservoir 34, 190 to accommodate shrinkage of the tank material as it hardens, as well as subsequent expansion and contraction of the fuel tank 12 during thermal cycling. Flexing of the mounting feet 210 may greatly reduce stress between the reservoir 34, 190 and tank 12 compared to an implementation where the reservoir is directly connected to the tank without the flexible mounting features. In addition or instead, a bracket 156 may be connected to the tank 12 as the tank is formed, and the reservoir 34, 190 may be mounted to or carried by the bracket. The bracket could be similar to the bracket 156 described above or of any suitable shape and construction. Finally, although noted as being overmolded during formation of the tank, connection features like flanges or voids may be provided in the tank 12 and the mounting feet 210 may be coupled to these connection features after the tank is formed, such as by a snap-fit or interference/press fit or another arrangement wherein the fuel tank material overlies a portion of the mounting feet or reservoir 34, 190 to retain the position of the reservoir within the tank 12.

The parison used to form the tank 12 may be defined by extruded polymers (e.g. a tubular parison as is known in the art) or by one or more pre-formed sheets of material that are heated so that they may be formed (and if necessary, joined together) into a desired shape. The parison may be formed into the fuel tank 12 via any suitable process. Representative examples include a blow molding process wherein a tubular parison is torn or cut after being received within a mold to expose the interior of the parison (e.g. pursuant to U.S. application Ser. No. 12/491,964, incorporated herein by reference in its entirety), a molding process where the reservoir is received within a tubular parison without the parison being cut (e.g. pursuant to U.S. Pat. No. 6,712,234 incorporated herein by reference in its entirety) and or processes wherein pre-formed sheets of material are vacuum or otherwise thermoformed in a mold and wherein the reservoir is inserted into the mold before the material is pinched/sealed to define the tank enclosure.

The reservoir 34 (FIGS. 1-11) and the reservoir 190 (FIGS. 14 and 15) may differ in size, shape, and fuel carrying capacity yet many components may be common to both. For example, the same cartridge, manifold, fluid lines, valves and connectors may be used, as desired. Various fuel routing schemes may be accommodated by the fuel pump assemblies so that the assemblies can readily be adapted to a range of different applications and fuel flow requirements. The jet pumps may be tuned or calibrated for a range of applications by use of different nozzles with the same manifold and reservoir structures to further improve the flexibility of the assemblies while maintaining a high number of common components.

Figure 16A:
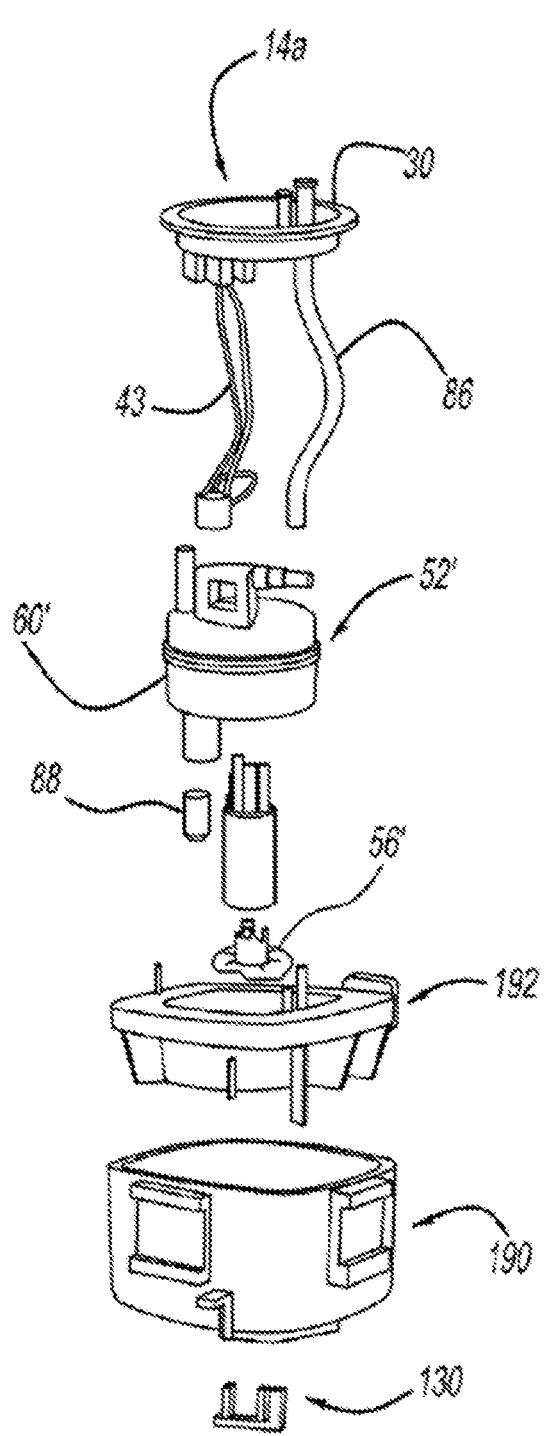
FIGS. 16a-16d are exploded views of different implementations of fuel pump assemblies including a plurality of common components in accordance with an exemplary embodiment.
Figure 16B:
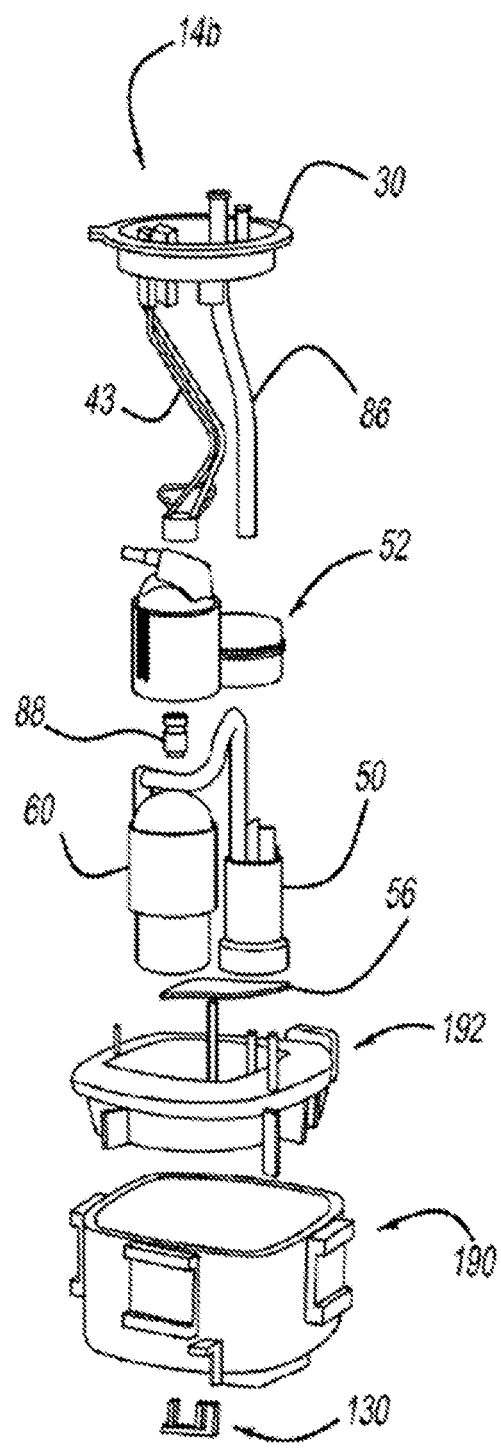
Figure 16C:
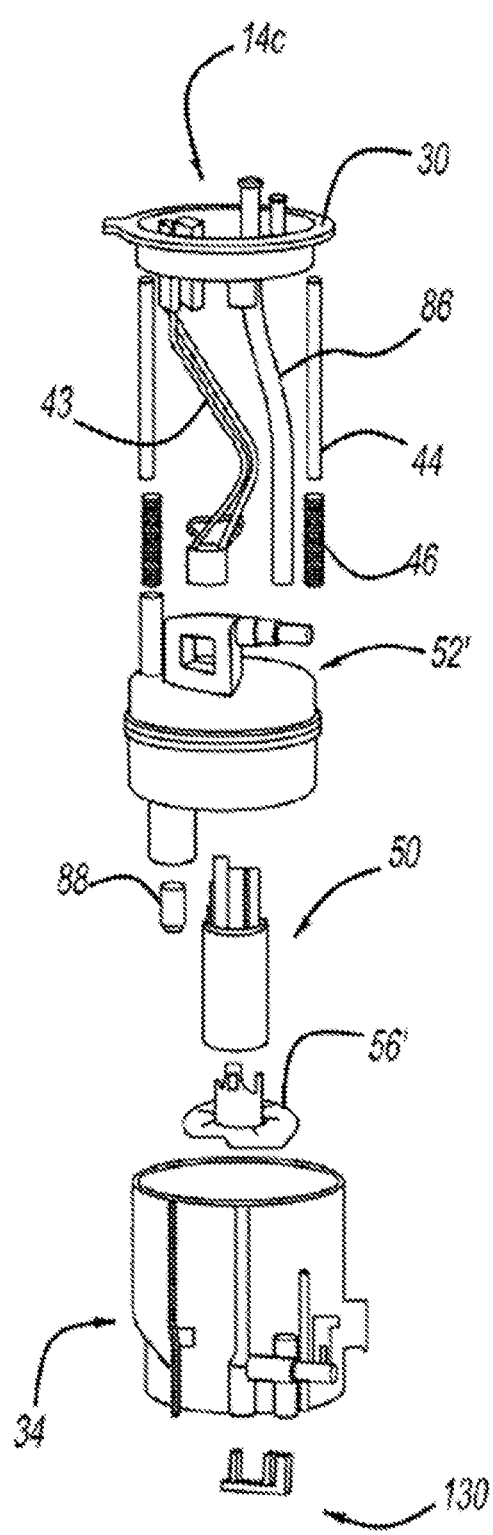
Figure 16D:
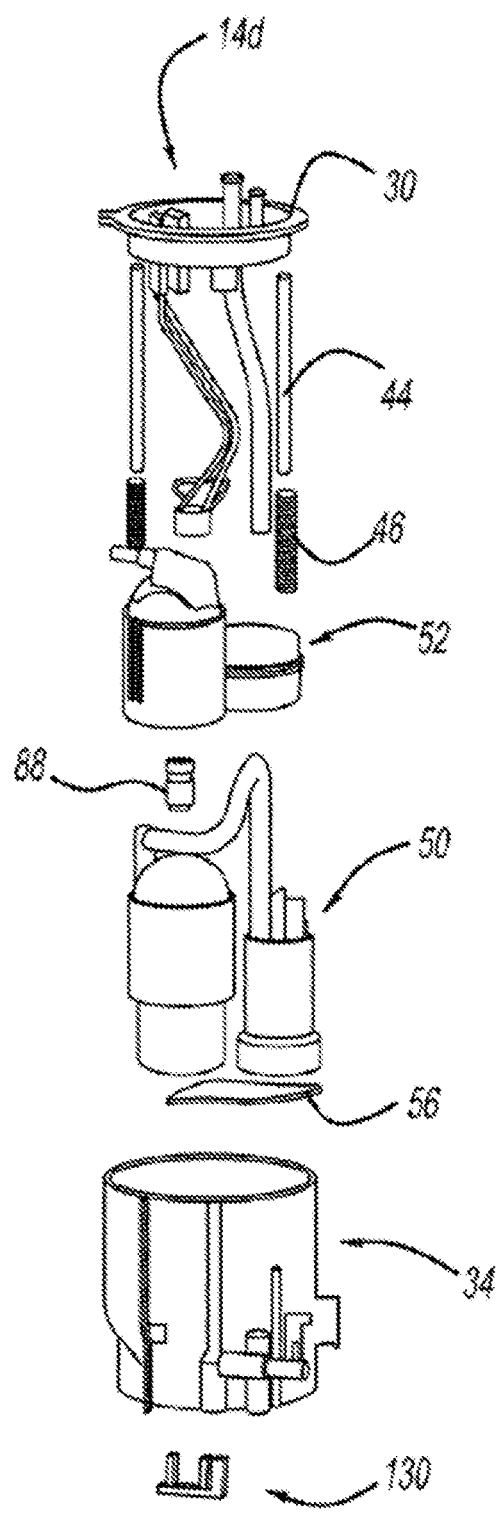

FIGS. 16A, 16B, 16C and 16D illustrate several iterations of fuel pump assemblies 14A, 14B, 14C and 14D that utilize a plurality of common components. Each assembly 14A-D is shown with a mounting flange 30, although a mounting flange is not necessary as previously described. Each assembly 14A-D as shown includes a fuel pump 50 and a fuel filter 60 or 60'. In FIGS. 16B and 16D, a cylindrical and annular filter 60 is shown as described above. The fuel pump assembly 14B of FIG. 16B is representative of the embodiments discussed with reference to FIGS. 14 and 15, and the fuel pump assembly 14 of FIG. 16D is as described with reference to FIGS. 1-11. In FIGS. 16A and 16C, an annular or torroidal fuel filter 60' is shown incorporated into a modified cartridge 52' having upper and lower portions 220, 222 that are connected together with the filter 60' between them. The filter 60' and modified cartridge 52' may include an opening 224, shown as being centrally located, in which a portion of the fuel pump 50 is received. In the fuel pump assembly 14A of FIG. 16A, the cartridge 52' is coupled to an insert 192 and a reservoir 190 which may be as described above with reference to FIGS. 14 and 15. In the fuel pump assembly 14C of FIG. 16C, the cartridge 52 is coupled to a reservoir 34 which may be as described above with reference to FIGS. 1-11, and that may be done with or without an insert 192 or similar adapter.

That is, the fuel pump assemblies 14A and 14B of FIGS. 16A and 16B may have the same components other than the filters and cartridges. Note that different pump inlet filters 56 and 56' are shown in these drawings, but the same filter could be used if desired. The fuel pump assemblies 14C and 14D of FIGS. 16C and 16D may also have the same components other than the filters and cartridges, as desired.

All embodiments may share similar manifolds 130, fluid routing schemes/circuits, jet pumps, valves (pressure control, check valves, etc) and fuel pumps, for example. A multitude of fuel pump assemblies may be created with the various components shown, both the components that may be common to all assemblies, and the two reservoir designs, two filter and cartridge designs, and the insert. Combinations of components other than as shown in the drawings will be apparent in view of this disclosure to persons of ordinary skill with regard to fuel pump assemblies.

FIGS. 16A-16D also illustrate that the fuel pump assemblies 14A-14D may be assembled in a vertical fashion, with the direction of installation of many components being parallel (e.g. in the same or opposed direction). For example, the cartridge 52, pump 50, pump inlet filter 56, pressure regulator 90, manifold 130, inlet valve 117, any insert that is used and the reservoir may be combined along the lines indicated by an arrow 230 shown in each figure.

Thus, there has been disclosed representative reservoir assemblies that are compatible for manufacturing different pump assemblies 14. The commonality between the fuel pump assemblies and methods of connecting the assemblies to a fuel tank enables a manufacturer to produce customer-specific fluid delivery systems with a reduction in unique components which equates to a reduced component count across a range of fuel pump assemblies, shorter design development periods for new programs, and reduced tooling costs. Further, the cartridge, fuel pump, fuel filters, regulator valve, relief valve, manifold and other components may be assembled in a vertical direction for ease of assembly and for ease of manufacturing molded components.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A system of fuel delivery assemblies for delivering fuel from a fuel tank, comprising: two separate fuel pump assemblies each having a reservoir with an interior to receive fuel inside the fuel tank, and wherein each reservoir has at least one dimension that is different than the other reservoir such that the interior shapes of the reservoirs are different; and an interchangeable cartridge having a housing, the cartridge comprising at least two fuel system components including at least a fuel pump and a fuel filter, the housing having an exterior shape that fits to the different interior shapes of the reservoirs, the housing and the reservoirs sized and structured relative to one another such that the housing is received and coupled to a single reservoir at a time so that the cartridge is structured to be separately coupled with the two separate reservoirs respectively, wherein the cartridge is structured to orient the at least two fuel system components relative to the single reservoir to which the cartridge is connected, wherein one of the reservoirs includes an adapter in one of the two fuel pump assemblies and the adapter includes an attachment feature engageable by the housing whereby the adapter is removably attached to the housing and a coupling feature engageable with the one reservoir to couple the housing to the one reservoir, whereas the other reservoir is coupled with the housing without the adapter in the other fuel pump assembly, and wherein the adapter extends toward a bottom of the one reservoir such that the adapter receives a portion of the fuel pump and the fuel filter positioned between the one reservoir and the housing.

2. The system of claim 1 wherein the reservoirs have different internal volumes.

3. The system of claim 1 wherein the housing is associated with the fuel pump and the fuel filter and positions at least part of the fuel pump and the fuel filter relative to the reservoir to which the housing is connected.

4. The system of claim 3 wherein the housing is adapted to mate with at least two different fuel pumps, the two different fuel pumps having at least one dimension that is different.

5. The system of claim 3 wherein the housing is adapted to mate with at least two different fuel filters, the two different fuel filters having at least one dimension that is different.

6. The system of claim 3 wherein the housing overlies at least part of the fuel filter.

7. The system of claim 6 wherein the fuel filter includes a filter element enclosed within the housing.

8. The system of claim 1 wherein the reservoirs each include a mount and the mounts of both reservoirs are of the same shape so that they are capable of carrying a same fuel level sensor, and in assembly, one fuel level sensor is mounted to each reservoir.

9. The system of claim 1 wherein the other reservoir includes a wall with an attachment feature that includes a mechanical connecting feature integrally formed in the wall, and the housing includes an integral mounting feature engageable with the mechanical connecting feature of the other reservoir to retain the position of the housing relative to the other reservoir.

10. The system of claim 9, wherein the mechanical connecting feature includes at least one of an axially extending flange, a flexible finger, tabs, detents, catches, clips, clasps and snaps.

11. The system of claim 1 further comprising a reservoir inlet passage, a reservoir outlet passage, and a manifold, wherein the manifold is adapted to be separately coupled to each of the reservoirs with an inlet communicated with the reservoir outlet passage to receive fuel discharged from the reservoir outlet passage and an outlet communicated with the reservoir inlet passage so that fuel discharged from the outlet is received in the reservoir inlet passage, the reservoirs and manifold being constructed and arranged so that the two different reservoirs are adapted to be coupled to identical manifolds.

12. A system of fuel delivery assemblies for delivering fuel from a fuel tank, comprising:
two separate fuel pump assemblies each having a reservoir with an interior to receive fuel inside the fuel tank, each reservoir has at least one dimension that is different than the other reservoir and each reservoir includes a receptacle, an outlet passage from which fuel is discharged and an inlet passage into which fuel is received; and
a manifold receivable by the receptacle of either reservoir, and adapted to be separately coupled to either one of the reservoirs with an inlet communicated with the reservoir outlet passage to receive fuel discharged from the reservoir outlet passage and an outlet communicated with the reservoir inlet passage so that fuel discharged from the outlet is received in the reservoir inlet passage, the reservoirs and manifold being constructed and arranged so that a single reservoir is structurally connected to the manifold at a time,
wherein one of the reservoirs includes an adapter in one of the two fuel pump assemblies and the adapter includes an attachment feature engageable by a housing whereby the adapter is removably attached to the housing and a coupling feature engageable with the one reservoir to couple the housing to the one reservoir, whereas the other reservoir is coupled to the housing without the adapter in the other fuel pump assembly, and
wherein the adapter extends toward a bottom of the one reservoir such that the adapter receives a portion of a fuel filter and a fuel pump, positioned between the housing and the one reservoir.

13. The system of claim 12 further comprising a nozzle carried by a manifold outlet and wherein each reservoir includes an inlet in communication with the reservoir inlet passage of that reservoir, and wherein discharge of fuel through the nozzle and out of the manifold outlet causes fuel in the inlet of the reservoir to flow into the inlet of the reservoir along with a flow of fuel from the manifold outlet.

14. The system of claim 13 wherein the reservoir inlet passage communicates with the reservoir interior to provide fuel into the reservoir interior.

15. The system of claim 13 wherein each reservoir includes a second inlet passage and the manifold includes a second outlet, the second outlet is communicated with the manifold inlet so that fuel received in the manifold inlet is routed to both outlets of the manifold and fuel that flows through the second outlet of the manifold flows into the reservoir second inlet passage.

16. A pump assembly that permits one reservoir selected among multiple reservoirs having different exterior shapes to be used in the pump assembly, comprising:
the selected reservoir having an interior to receive fuel;
a fuel pump having an inlet arranged to receive fuel from the interior of the selected reservoir and an outlet through which pressurized fuel is discharged;
an outlet filter receiving the fuel discharged from the outlet of the fuel pump;
an interchangeable cartridge having a housing, the housing receiving an upper portion of the fuel pump and the outlet filter, and being engaged with an opening of the selected reservoir with the fuel pump and the outlet filter received at least partially between the housing and the selected reservoir, the housing including at least one fuel passage through which pressurized fuel from the fuel pump is routed; and
an insert fitted in the selected reservoir having a bore sized to receive the housing of the interchangeable cartridge, the insert being removably attached to the selected reservoir such that a different reservoir, which has at least one dimension that is different from the selected reservoir, receives the housing of the interchangeable cartridge at another time without the insert fitted to the different reservoir.

17. The assembly of claim 16 wherein the outlet filter is carried by the selected reservoir and wherein the fuel pump outlet is communicated with an inlet of the outlet filter and an outlet of the outlet filter is communicated with the at least one fuel passage of the housing.

18. The assembly of claim 17 wherein the at least one fuel passage of the housing comprises a first passage and a second passage in communication with the first passage, and wherein fuel flowing through the first passage is routed to an engine and fuel flowing through the second passage is routed to a jet pump that pumps fuel into the selected reservoir and is carried by the selected reservoir.

19. The assembly of claim 18 wherein the selected reservoir includes an outlet passage through which fuel flows to an inlet of the jet pump and the selected reservoir includes an inlet passage that is communicated with the selected reservoir interior and through which fuel pumped by the jet pump flows into the selected reservoir interior.

* * * * *